United States Patent
Raghavan et al.

(10) Patent No.: US 11,770,163 B1
(45) Date of Patent: Sep. 26, 2023

(54) INTERFERENCE MITIGATION FOR ADAPTIVE BEAM WEIGHT-BASED UL COMMUNICATIONS

(71) Applicant: QUALCOMM Incorporated, San Diego, CA (US)

(72) Inventors: Vasanthan Raghavan, West Windsor Township, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/660,315

(22) Filed: Apr. 22, 2022

(51) Int. Cl.
*H04B 7/02* (2018.01)
*H04B 7/0456* (2017.01)

(52) U.S. Cl.
CPC ................... *H04B 7/0456* (2013.01)

(58) Field of Classification Search
CPC ............................ H04B 7/0456; H04B 7/0421
USPC .......................................................... 375/267
See application file for complete search history.

(56) References Cited

U.S. PATENT DOCUMENTS

| | | | | |
|---|---|---|---|---|
| 9,667,334 B2* | 5/2017 | Xi | ........................ | H04B 7/0671 |
| 10,491,278 B2* | 11/2019 | Chen | .................... | H04B 7/0617 |
| 2016/0353294 A1* | 12/2016 | Wang | .................... | H04W 24/02 |
| 2019/0393944 A1* | 12/2019 | Huang | ................. | H04B 7/0639 |
| 2020/0195320 A1 | 6/2020 | Raghavan et al. | | |
| 2021/0044336 A1 | 2/2021 | Lee et al. | | |
| 2021/0067225 A1* | 3/2021 | Mo | ........................ | H04L 5/0064 |

FOREIGN PATENT DOCUMENTS

| | | | |
|---|---|---|---|
| CN | 107666333 A | * | 2/2018 |
| WO | WO 2018232101 | * | 12/2018 |

OTHER PUBLICATIONS

Sung Joon Maeng et al (Hybrid Beamforming for Reduction of Inter-Beam Interference in Millimeter-Wave Cellular Systems), Sensors (Based), Published online Feb. 9, 2018.*
International Search Report and Written Opinion—PCT/US2023/018734—ISA/EPO—dated Jul. 14, 2023.

* cited by examiner

*Primary Examiner* — Helene E Tayong
(74) *Attorney, Agent, or Firm* — QUALCOMM Incorporated

(57) ABSTRACT

A user equipment (UE) may transmit a first request for the uplink (UL) communications with a network node to be switched from a first serving cell in a first frequency range and a second serving cell in a second frequency range to a serving cell over a single first frequency range based on switching from a static codebook based hybrid beamforming to at least one of an adaptive beam weight hybrid beamforming. The UE may further transmit a second request for the network node to measure an interference caused by the UL communications from the UE with the adaptive beam weight hybrid beamforming.

30 Claims, 11 Drawing Sheets

INTERFERENCE MITIGATION FOR ADAPTIVE BEAM WEIGHT-BASED UL COMMUNICATIONS

TECHNICAL FIELD

The present disclosure relates generally to communication systems, and more particularly, to a method of wireless communication including an interference mitigation for an adaptive beam weight-based UL communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) and a network node. The UE may receive an indication from at least one network node to switch from a static codebook based hybrid beamforming to at least one of an adaptive beam weight hybrid beamforming for uplink (UL) communications, transmit a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming, receive an affirmative response to switch the UL communications with the at least one network node from the first serving cell in the first frequency range and the second serving cell in the second frequency range to the serving cell over the single first frequency range, and switch the UL communications with the at least one network node from the first serving cell in the first frequency range and the second serving cell in the second frequency range to the serving cell over the single first frequency range. The network node may transmit an indication for a UE to switch from a static codebook based hybrid beamforming to at least one of an adaptive beam weight hybrid beamforming for UL communications, receive a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming, and transmit an affirmative response to switch the UL communications from the UE from the first serving cell in the first frequency range and the second serving cell in the second frequency range to the serving cell over the single first frequency range To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
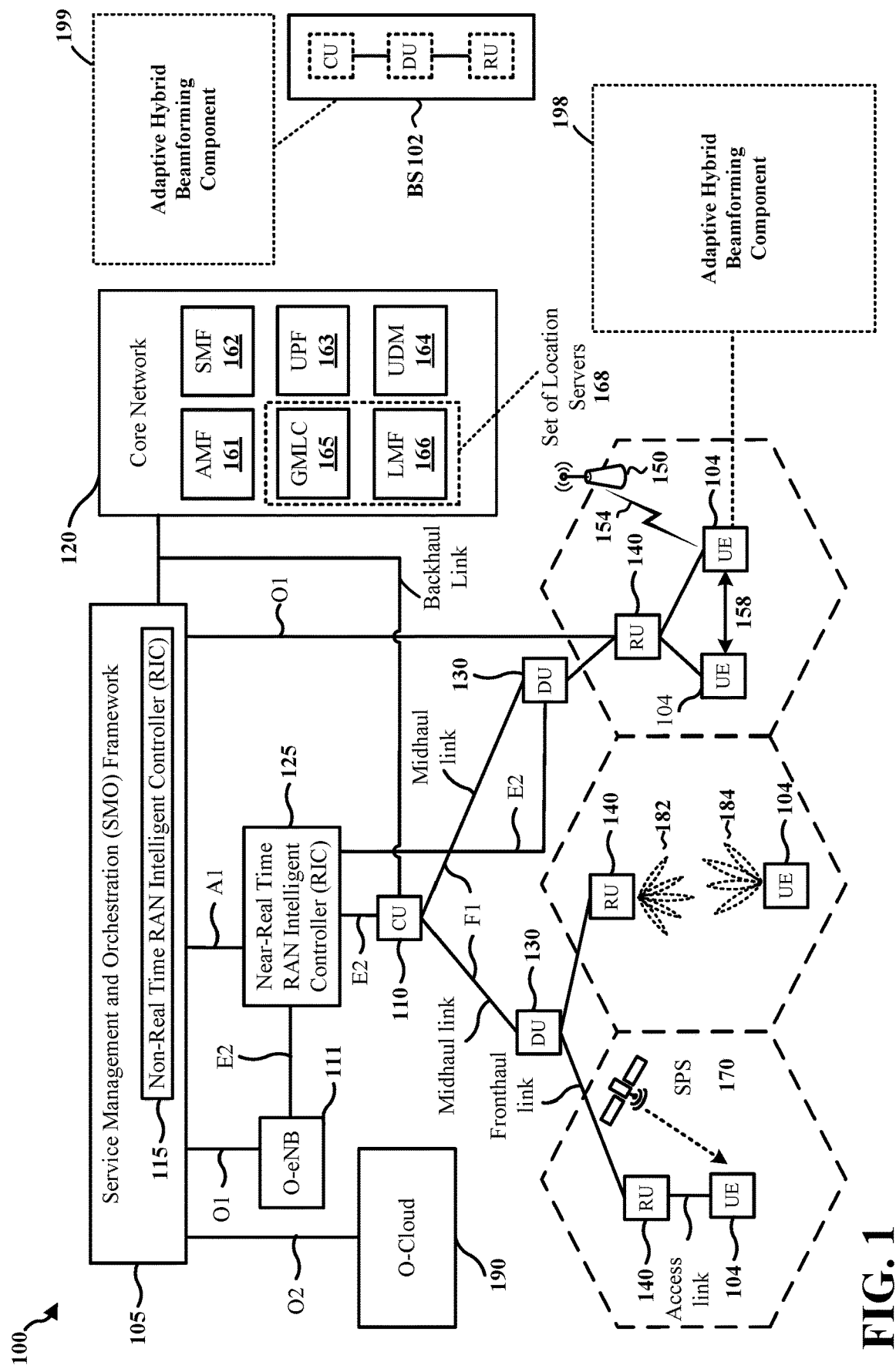
FIG. 1 is a diagram illustrating an example of a wireless communications system and an access network.

A user equipment (UE) may be connected to multiple serving cells associated with different frequency ranges. In some aspects, the UE may switch from a static codebook based hybrid beamforming to an adaptive beam weight hybrid beamforming. As presented herein, the UE may request the network node to switch the UL communication to a serving cell over a single first frequency range (e.g., FR1). By switching to the single first frequency range, the UE may mitigate the interference caused by the UL communications with the adaptive beam weight hybrid beamforming.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming.

The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an adaptive hybrid beamforming component 198 configured to receive an indication from at least one network node to switch from a static codebook based hybrid beamforming to at least one of an adaptive beam weight hybrid beamforming for uplink (UL) communications, transmit a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming, receive an affirmative response to switch the UL communications with the at least one network node from the first serving cell in the first frequency range and the second serving cell in the second frequency range to the serving cell over the single first frequency range, and switch the UL communications with the at least one network node from the first serving cell in the first frequency range and the second serving cell in the second frequency range to the serving cell over the single first frequency range. In certain aspects, the base station 102 may include an adaptive hybrid beamforming component 199 configured to transmit an indication for a UE to switch from a static codebook based hybrid beamforming to at least one of an adaptive beam weight hybrid beamforming for UL communications, receive a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming, and transmit an affirmative response to switch the UL communications from the UE from the first serving cell in the first frequency range and the second serving cell in the second frequency range to the serving cell over the single first frequency range. Although the following description may be focused on 5G NR, the concepts described herein may be applicable to other similar areas, such as LTE, LTE-A, CDMA, GSM, and other wireless technologies.

Figure 2:
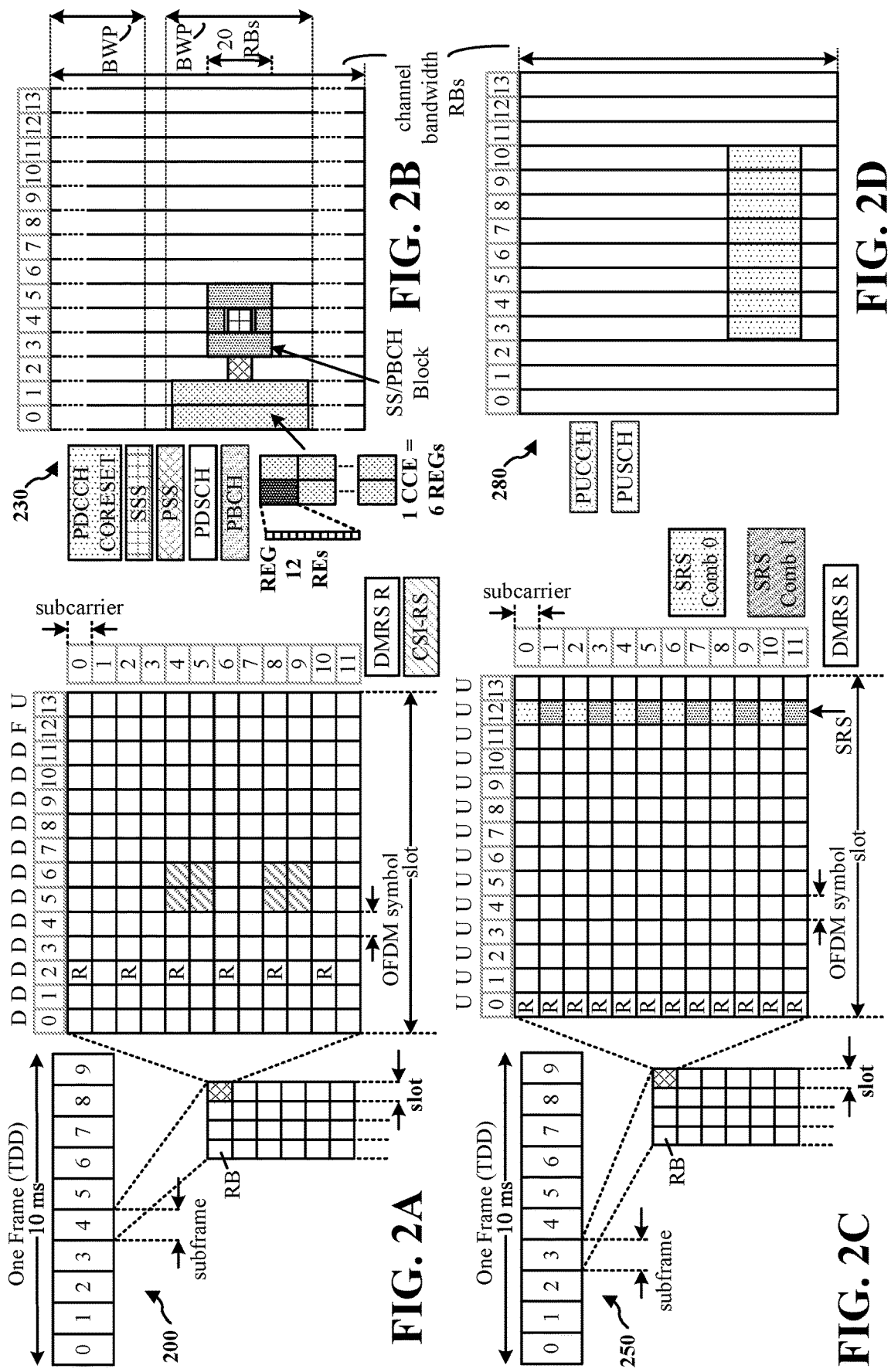
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu$ *15 kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
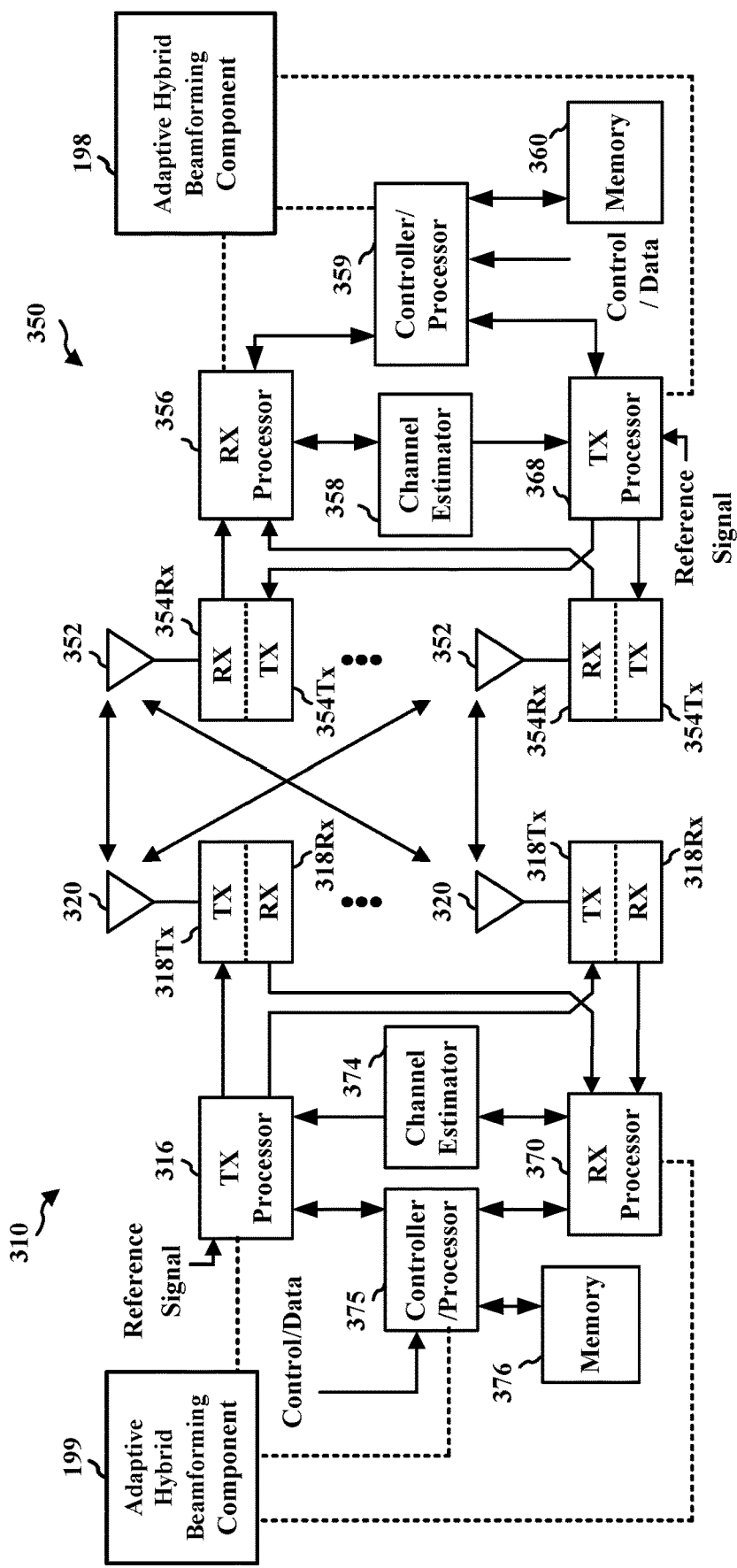
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the adaptive hybrid beamforming component 198 of FIG. 1. At least one of the TX processor 316, the RX processor 370, and the controller/processor 375 may be configured to perform aspects in connection with the adaptive hybrid beamforming component 199 of FIG. 1.

Wireless communication may be exchanged in various frequencies. For example, a carrier frequency for wireless communication may be in the FR1 or FR2 bands, and furthermore in upper millimeter-wave bands, e.g., greater than 52.6 GHz, and sub-TeraHertz bands, e.g., greater than 114.25 GHz. The wireless communication may include beamforming, such as described in connection with 182 and 184 in FIG. 1. In some aspects, beamforming mechanisms may be provided for performing beamforming at the UE side or at the base station side, maintaining links, switching beams, addressing beam failure recovery, etc. Wireless communication systems configured with relatively higher carrier frequencies may include various applications of beamforming, for example.

In one example, a hybrid beamforming refers to adjusting the digital data using analog phase shifters to change the phase of the signal. Accordingly, the hybrid beamforming application may include precoding or combining performed in two stages in a digital domain and an analog domain. The hybrid beamforming application may include a static codebook based hybrid beamforming or adaptive beam weight hybrid beamforming (or a non-codebook based hybrid beamforming).

At the UE's side, the UE may not have unlimited RFIC memory resources, and the UE may not perform the hybrid beamforming based on a set of arbitrary beam weights. Accordingly, the UE may use a set of beam weights to perform the hybrid beamforming. For example, the UE may include an antenna array, e.g., a planar antenna array including an M×N antenna array or an N×M antenna array, and the UE may apply appropriate beam weights for each of the multiple antenna element so that the UE may co-phase and combine the energy across the multiple antenna elements. The UE may include a phase shifter and an amplitude controller for the beam weight. Based on the hybrid beamforming, the UE may determine to scale the phase or the amplitude and shift the phase accordingly.

In one aspect, a static codebook based hybrid beamforming may refer to the analog/hybrid beamforming applications focusing on steering energy in specific directions of beamspace, e.g., providing directional beams for wireless communication. The static codebook based hybrid beamforming may correspond to selecting beam weights from a codebook stored in a radio frequency integrated circuit (RFIC) memory of one or more RFICs used to control the at least one antenna module or panel. The static codebook based hybrid beamforming may provide a relatively faster process in terms of beam weight loading and be affordable for a practical implementation with a limited amount of memory at a low cost and complexity. The codebook including the beam weights may be determined after the beam characterization process which may be an offline process done on a sample UE. That is, the beam weights of the codebook may be configured based on online or offline testing or analyzing the beam characterization performed on a sample UE.

In another aspect, the adaptive beam weight hybrid beamforming may refer to selecting beam weights that may not be stored in the RFIC memory. The codebook may not be stored in RFIC memory, and the codebook may be considerably larger than the static codebook for the static codebook based hybrid beamforming. The adaptive beam weight hybrid beamforming may, in tradeoff of a slower beam weight loading process for the beamforming process, select beam weights that may be more targeted for the observed channel conditions that may be fading. That is, the adaptive beam weight hybrid beamforming may provide the network entities, including the network node and the UE, with the beam weights that are more useful for the observed channel conditions. At the same time, the adaptive beam weight hybrid beamforming includes the slower beam weight loading process for the beamforming process. Furthermore, a network entity with limited computing power may not have the sufficient processing power to compute information related to the side lobe caused by the adaptive beam weight hybrid beamforming process. The adaptive beam weight hybrid beamforming may be referred to as a dynamic codebook based hybrid beamforming or a non-codebook beam weight hybrid beamforming.

As the adaptive beam weight hybrid beamforming systems mature, a general set of adaptive/dynamic beam weights may become relevant. The codebook for the adaptive/dynamic codebook based hybrid beamforming may be configured to include a general set of adaptive/dynamic beam weights, and the network entities including the network node or the UE may use the general set of adaptive/dynamic beam weights to perform the adaptive beam weight hybrid beamforming.

The general set of adaptive/dynamic beam weights may be selected to address a wider angular spread for the dominant cluster in the channel, multi-beam effects such as multiple lobes across multiple clusters, a side lobe control, signal blockage from a user's hand or UE material related impairments, or polarization-specific impairments at the UE (e.g., due to UE housing, materials/sensors at the UE, etc.).

In contrast to static beam weights, which may be designed a priori, the adaptive/dynamic beam weights (or the non-codebook beam weights) may be identified or learned in real-time. Also, compared to the static beam weights which may have predictable beam patterns, the adaptive beam weight hybrid beamforming may create increased interference in unpredictable directions depending on the beam weights used by the UE.

In the static beam weight hybrid beamforming, the beam weights selected to steer energy in certain directions using a set of antennas (or an antenna array) may have certain deterministic properties. In one aspect, the static codebook based beam weights may be similar to DFT beam weights. First, based on the direction of the beam, the direction of a first side lobe, a second side lobe, and so on may be determined. Also, the beam patterns are predictable in terms of main lobe gain, depending on the array size, main lobe-to-$1^{st}$ side lobe angle gap, $1^{st}$ side lobe level (relative to the main lobe), etc. That is, the peak gain obtained in the direction may depend on the antenna numbers that are used. For example, for a uniform linear array with $\lambda/2$ spacing, an N-element array may provide a peak gain of $10 \log_{10} N$. That is, a 16 element array may have a 12 dB peak gain, and an eight element array may have a 9 dB peak gain.

The first side lobe may also have a gain that is lower than the peak gain of the main lobe. For example, the gain of the side lobe may be 13.1 dB to 13.4 dB lower than the peak gain of the main lobe. Typically, the $1^{st}$ side lobe is at ~13.4 dB below the main lobe, assuming that the antenna array includes 8 or more antenna elements. For example, the main lobe with the peak gain of 9 dB may be associated with the first side lobe with gain of −4 dB. Similarly, the second side lobe, the third side lobe, etc. may also be predictable in terms of angular gaps and side lobe levels. Accordingly, when performing the static beam weight hybrid beamforming, the UE may understand the interference pattern caused by the signal.

In the adaptive beam weight hybrid beamforming, the adaptive beam weights may be determined to accommodate more complex implementation of the phases and amplitude of the hybrid beamforming. For example, an antenna array may be implemented to steer the beam towards two or three directions.

As beam weights become adaptive, the interference directions and their side lobes could become more unpredictable, compared with the case of the static beam weight beamforming or the DFT beam weight beamforming. That is, the adaptive beam weights may not provide a simple formula to predict or understand the direction or gain of the side lobes. For example, the Pt side lobe could be 10 dB less than the main lobe and at a steering angle which had seen a 25 dB (below) gain pattern with a DFT beam, and the interference in that direction may be increased by 15 dB.

Therefore, the adaptive beam weight hybrid beamforming may provide further control over the flexibility of the beam pattern or the shapes of the beam, but may have less control or awareness over the interference pattern created by the beam. The relatively higher interference caused from uplink transmissions may affect adjacent devices (e.g., another UE on side link, another TRP, another coexisting system such as FWA, satellites, airline transmissions, etc.) For example, interference in a C-band may interfere with radio altimeter deployments used in airplanes, which may cause safety issues.

The network node and the UE may be connected via a carrier aggregation (CA) system or dual connectivity (DC) system. As an example of CA, communication link between the UE and the network may be through one or more carriers. A base station and UE may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Dual Connectivity (DC) may enable UEs to communication on different carriers in different frequency ranges to provide improved network coverage and data rate. While connected with the network in CA or DC, the UL communications and the DL communications may be associated with a first serving cell in a first frequency range and a second serving cell in a second frequency range. In one aspect, the first frequency range corresponds to frequency range 1 (FR1), and the second frequency range corresponds to frequencies greater than FR1, wherein the single first frequency range is the FR1 frequency range. Here, the second frequency range may be above 7.125 GHz, including the FR2, FR2-2, FR3, FR4, and FR5. In one example, the UE in the non-standalone mode CA may be connected to the first serving cell associated with FR1 and the second serving cell associated with FR2. As the adaptive beam weight hybrid beamforming is implemented for the UE to transmit the UL communication over the first serving cell in the first frequency range and the second serving cell in the second frequency range, the UL communication may cause increased interference in unpredictable directions.

In some aspects, the UE may be configured to request that the transmission of the UL communication using the adaptive beam weight hybrid beamforming be switched to a serving cell over a single first frequency range. That is, based on switching from the static codebook based hybrid beamforming to at least one of the adaptive beam weight hybrid beamforming, the UE may be configured to request that the transmission of the UL communication using the adaptive beam weight hybrid beamforming be switched from the first serving cell in the first frequency range and the second serving cell in the second frequency range to a serving cell over a single first frequency range. For example, the beamforming implementation of the UE connected to the first serving cell associated with FR1 and the second serving cell associated with FR2 may be switched from the static codebook based hybrid beamforming to at least one of the adaptive beam weight hybrid beamforming, and the UE may request the network node to switch the UL communication from the non-standalone mode CA associated with FR1 and FR2 to a single cell associated with FR1.

By switching the UE communications using the adaptive beam weight hybrid beamforming from the first serving cell in the first frequency range and the second serving cell in the second frequency range to a serving cell over the single first frequency range (e.g., FR2+FR1), the UE may reduce the interference to the adjacent network entities (e.g., other network node or UEs) caused from switching from the static codebook based hybrid beamforming to at least one of the adaptive beam weight hybrid beamforming.

In one aspect, the UE may receive an indication from at least one network node to switch from an analog or hybrid codebook based beamforming beams with the DFT-type beam pattern properties to an adaptive beam weight codebook. That is, the network node may transmit an indication for the UE to switch from a static codebook based hybrid beamforming to at least one of the adaptive beam weight hybrid beamforming for UL communications. In another aspect, the UE may let the base station know that the UE is switching from an analog or hybrid codebook based beamforming beams with the DFT-type beam pattern properties to the adaptive beam weight codebook. Based on receiving the indication to switch from the static codebook based hybrid beamforming to at least one of the adaptive beam weight hybrid beamforming, the UE may transmit a first request for the UL communications with the at least one network node to be switched from the first serving cell in the first frequency range and the second serving cell in the second frequency range to the serving cell over the single first frequency range.

In another aspect, the UE can indicate the directions relative to a boresight where side lobes, which corresponds to the UL interference, may be seen and side lobe levels, e.g., relative to the main lobe level. The network node may take the at least one of directions of one or more side lobes or levels of the one or more side lobes associated with the adaptive beam weight hybrid beamforming to determine whether to instruct the UE to switch the UL communications to the serving cell over the single first frequency range.

In another aspect, the UE may recommend or request the at least one network node with the switch the UL communications from the first serving cell in the first frequency range and the second serving cell in the second frequency range to the serving cell over the single first frequency range based on configuration or measurement of any sidelink transmissions. That is, the UE may infer the network environment based on the sidelink transmissions, and may request that the UL communications using the at least one of the adaptive beam weight hybrid beamforming be switched from the first serving cell in the first frequency range and the second serving cell in the second frequency range (e.g., FR2+FR1) to the serving cell over the single first frequency range (e.g., FR1).

In one aspect, the network node may determine whether the UE's side lobes may be creating unnecessary interference to existing set of network entities including at least one of UE or network node, and configure or instruct the switch from the first serving cell in the first frequency range and the second serving cell in the second frequency range (e.g., FR2+FR1) to the serving cell over the single first frequency range (e.g., FR1).

In some aspects, based on the UE using the adaptive beam weight hybrid beamforming, the UE may request its serving TRP and/or other TRPs to measure the signal from its transmissions. In one aspect, the UE may request the network node associated with the serving cell or other network node not associated with the serving cell to measure the UL communication signal or an interference caused from the UL communication using the adaptive beam weight hybrid beamforming.

In another aspect, the UE may request its serving TRP to inform other TRPs to measure its transmissions anticipating that the UE's transmissions may be received by other TRPs. That is, the UE may request the network node associated with the serving cell of the UE to instruct other network nodes that are not associated with the serving cell to measure the UL communications or the interference caused by the UL communications using the adaptive beam weight hybrid beamforming. In one example, the request of the UE may be conditioned on a spatial relationship where the UE would use it for its uplink transmissions, or a set of beams UE may sweep in its transmissions. That is, the UE's request to measure the UL communications or the interference caused by the UL communications using the adaptive beam weight hybrid beamforming may be associated with at least one of a spatial relationship of a beam used by the UE for the UL communications or a set of beams used by the UE for beamforming.

Based on these measurements from the TRPs, including the network node associated with the serving cell of the UE or the other network nodes not associated with the serving cell of the UE, may determine the UE's transmission beam is interfering too much and signal a beam change request to the UE. That is, the network node associated with the serving cell of the UE may obtain the measurement of the UL communications or the interference caused by the UL communications using the adaptive beam weight hybrid beamforming from measuring or from other network nodes not associated with the serving cell of the UE, the network node may determine whether the UE's UL communications using the adaptive beam weight hybrid beamforming generates an interference greater than or equal to a threshold value.

In another aspect, the network node may request other UEs to measure the UL communications or the interference caused by the UL communications using the adaptive beam weight hybrid beamforming. The other UEs may have its DL or UL transmissions, and the measurement may be used for inter-UE cross link interference (CLI) management.

In another aspect, the UE may indicate the network node that the UL transmission may cause interference to other TRPs or UEs, and the network node may measure the UL communications or the interference caused by the UL communications using the adaptive beam weight hybrid beamforming. Furthermore, based on the indication from the UE that the UL transmissions may cause interference to other TRPs or UEs, the network node may instruct the network node not associated with the serving cell of the UE or the other UEs to measure the UL communications or the interference caused by the UL communications using the adaptive beam weight hybrid beamforming.

Figure 4:
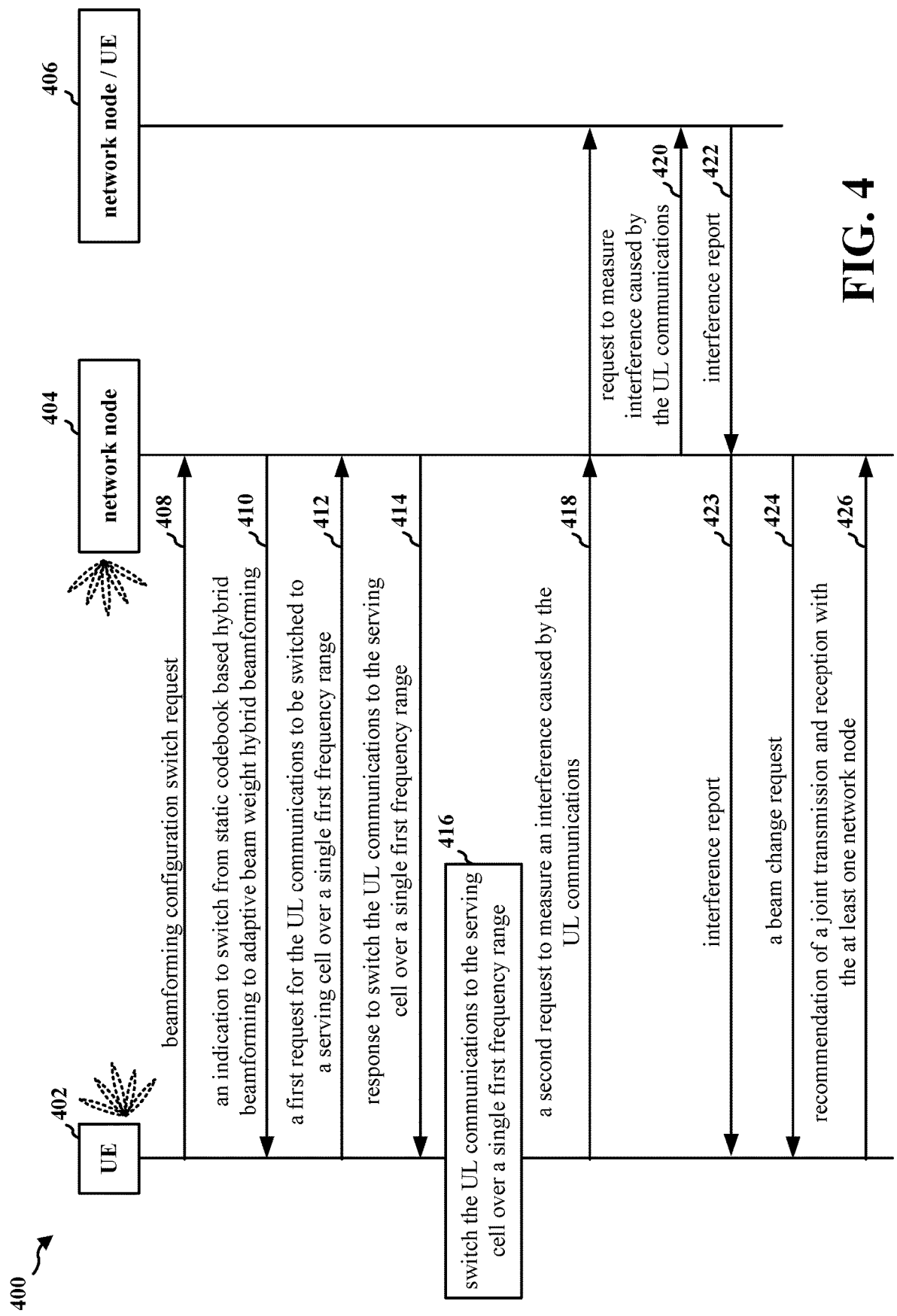
FIG. 4 is a call-diagram of a method of wireless communication.

In another aspect, the UE may determine that an adaptive beam weight beamforming to the network node may create unnecessary interference, and the UE may recommend or request a joint transmission and reception from another network node with the adaptive beam weight meets interference constraints. That is, in response to determining that the adaptive beam weight beamforming to the network node may create unnecessary interference while there is another network node that meets the interference constraints, the UE may request the joint transmission and reception from another network node FIG. 4 is a call-flow diagram 400 of a method of wireless communication. The call-flow diagram 400 may include a user equipment (UE) 402, a network node 404, and a network node/UE 406. The UE 402 may be connected to a first serving cell in a first frequency range and a second serving cell in a second frequency range. The network node 404 may be associated with a serving cell of the UE 402. The network node/UE 406 may include one or more network nodes not associated with the at least one serving cell or one or more other UEs. The UE 402 may transmit a first request for the uplink (UL) communications with a network node 404 to be switched from a first serving cell in a first frequency range and a second serving cell in a second frequency range to a serving cell over a single first frequency range based on switching from a static codebook based hybrid beamforming to at least one of an adaptive beam weight hybrid beamforming. The UE 402 may further transmit a second request for the network node 404 to measure an interference caused by the UL communications from the UE 402 with the adaptive beam weight hybrid beamforming.

At 408, the UE 402 may transmit a beamforming configuration switch request requesting the switch from the static codebook based hybrid beamforming to the at least one of the adaptive beam weight hybrid beamforming for the UL communications with the at least one network node 404. The network node 404 may receive a beamforming configuration switch request requesting the switch from the static codebook based hybrid beamforming to the at least one of the adaptive beam weight hybrid beamforming for the UL communications from the UE 402.

At 410, the network node 404 may transmit an indication for the UE 402 to switch from a static codebook based hybrid beamforming to at least one of an adaptive beam weight hybrid beamforming for UL communications. The UE 402 may receive an indication from the at least one network node 404 to switch from a static codebook based hybrid beamforming to at least one of an adaptive beam weight hybrid beamforming for UL communications. In one aspect, the indication to switch from the static codebook based hybrid beamforming to the at least one of the adaptive beam weight hybrid beamforming may be received based on a transmission of the beamforming configuration switch request. The indication may indicate the switch at the UE 402 from the static codebook based hybrid beamforming to the adaptive beam weight hybrid beamforming. In another aspect, the network node 404 may transmit the indication for the UE 402 to switch from the static codebook based hybrid beamforming to the at least one of the adaptive beam weight hybrid beamforming without receiving a request from the UE 402.

At 412, the UE 402 may transmit a first request for the UL communications with the at least one network node 404 to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming. The network node 404 may receive a first request for the UL communications from the UE 402 to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming. Here, the first frequency range may correspond to FR1, and the second frequency range may correspond to frequencies greater than FR1, where the single first frequency range is the FR1 frequency range. For example, the second frequency range may be above 7.125 GHz, including the FR2, FR2-2, FR3, FR4, and FR5.

In one aspect, the first request may include at least one of directions of one or more side lobes or levels of the one or more side lobes based on the adaptive beam weight hybrid beamforming. The network node 404 may take the at least one of directions of one or more side lobes or levels of the one or more side lobes associated with the adaptive beam weight hybrid beamforming to determine whether to instruct the UE 402 to switch the UL communications to the serving cell over the single first frequency range.

In another aspect, the first request may be based on a configuration of sidelink communication. That is, the UE 402 may recommend or request the at least one network node 404 with the switch the UL communications from the first serving cell in the first frequency range and the second serving cell in the second frequency range to the serving cell over the single first frequency range based on configuration or measurement of any sidelink transmissions. The UE 402 may infer the network environment based on the sidelink transmissions, and request that the UL communications using the at least one of the adaptive beam weight hybrid beamforming to be switched from the first serving cell in the first frequency range and the second serving cell in the second frequency range (e.g., FR2+FR1) to the serving cell over the single first frequency range (e.g., FR1).

At 414, the network node 404 may transmit an affirmative response to switch the UL communications from the UE 402 from the first serving cell in the first frequency range and the second serving cell in the second frequency range to the serving cell over the single first frequency range. The UE 402 may receive an affirmative response to switch the UL communications with the at least one network node 404 from the first serving cell in the first frequency range and the second serving cell in the second frequency range to the serving cell over the single first frequency range.

At 416, The UE 402 may switch the UL communications with the at least one network node 404 from the first serving cell in the first frequency range and the second serving cell in the second frequency range to the serving cell over the single first frequency range. By switching the UE communications using the adaptive beam weight hybrid beamforming from the first serving cell in the first frequency range and the second serving cell in the second frequency range to a serving cell over the single first frequency range (e.g., FR2+FR1), the UE 402 may reduce the interference to the adjacent network entities (e.g., other network node or UEs) caused from switching from the static codebook based hybrid beamforming to at least one of the adaptive beam weight hybrid beamforming.

At 418, the UE 402 may transmit a second request for the at least one network node 404 to measure an interference caused by the UL communications from the UE 402 with the adaptive beam weight hybrid beamforming. The network node 404 may receive a second request for the at least one network node 404 to measure an interference caused by the UL communications from the UE 402 with the adaptive beam weight hybrid beamforming.

In some aspects, the second request to measure the interference caused by the UL communications with the adaptive beam weight hybrid beamforming may include a request to instruct the network node/UE 406 to measure the interference caused by the UL communications with the adaptive beam weight hybrid beamforming at the network node/UE 406. The network node/UE 406 may include the one or more network nodes not associated with the at least one serving cell and the one or more other UEs. In one aspect, the second request to measure the interference caused by the UL communications with the adaptive beam weight hybrid beamforming may include a request to instruct one or more network nodes not associated with the at least one serving cell of the network node/UE 406 to measure the interference caused by the UL communications with the adaptive beam weight hybrid beamforming. In another aspect, the second request to measure the interference caused by the UL communications with the adaptive beam weight hybrid beamforming may include a request to instruct one or more other UEs of the network node/UE 406 to measure the interference caused by the UL communications with the adaptive beam weight hybrid beamforming.

In some aspect, the request to instruct the network node/UE 406 to measure the interference caused by the UL communications with the adaptive beam weight hybrid beamforming at the network node/UE 406 may be transmitted from the UE 402 directly to the network node/UE 406. The network node/UE 406 may include the one or more network nodes not associated with the at least one serving cell and the one or more other UEs. In one aspect, the request for the one or more network nodes not associated with the at least one serving cell to measure the interference caused by the UL communications with the adaptive beam weight hybrid beamforming at the one or more network nodes may be directly transmitted to the one or more network nodes of the network node/UE 406. In another aspect, the request for the one or more other UEs to measure the interference caused by the UL communications with the adaptive beam weight hybrid beamforming at the one or more other UEs may be directly transmitted to the one or more other UEs of the network node/UE 406. Here, the request may be transmitted from the UE 402 to the one or more other UEs of the network node/UE 406 via a sidelink communication.

At 420, the network node 404 may instruct the network node/UE 406 to measure the interference caused by the UL communications with the adaptive beam weight hybrid beamforming. Here, the network node/UE 406 may include one or more network nodes not associated with the at least one serving cell or one or more other UEs. In some aspects, the UE 402 may transmit the request 418 that is received by the network node 404.

In one aspect, the network node 404 may instruct the one or more network nodes not associated with the at least one serving cell to measure the interference caused by the UL communications with the adaptive beam weight hybrid beamforming. In another aspect, the network node 404 may instruct the one or more other UEs to measure the interference caused by the UL communications with the adaptive beam weight hybrid beamforming.

At 422, the network node 404 may receive at least one report of the interference caused by the UL communications with the adaptive beam weight hybrid beamforming measured at the network node/UE 406. The network node/UE 406 may include one or more network nodes not associated with the at least one serving cell or one or more other UEs, and the network node 404 may determine whether the UL communications with the adaptive beam weight hybrid beamforming causes interference for the network node/UE 406 may include one or more network nodes not associated with the at least one serving cell or one or more other UEs.

At 423, UE 402 may receive at least one report of the interference caused by the UL communications with the adaptive beam weight hybrid beamforming. The at least one report may include at least one of a first report of a first interferences caused by the UL communications with the adaptive beam weight hybrid beamforming at the network node 404 or a second report of a second interference caused by the UL communications with the adaptive beam weight hybrid beamforming at the network node/UE 406. In one aspect, the network node 404 may measure the first interference caused by the UL communications with the adaptive beam weight hybrid beamforming at the network node 404 based on the second request received at 418, and transmit the first report of the first interference to the UE 402. The UE 402 may receive the first report. In another aspect, the network node 404 may send the second report of the second interference caused by the UL communications with the adaptive beam weight hybrid beamforming at the network node/UE 406 received at 422. In another aspect, the second report of the second interference caused by the UL communications with the adaptive beam weight hybrid beamforming at the network node/UE 406 may be directly received from the network node/UE 406. In one example, the UE 402 may receive the second report from the one or more other UEs of the network node/UE 406 via the sidelink communication.

At 424, the network node 404 may transmit a beam change request from the at least one network node 404 to switch an UL communications beam the based on a measurement of the interference caused by the UL communications with the adaptive beam weight hybrid beamforming being greater than or equal to a threshold value. The UE 402 may receive a beam change request from the at least one network node 404 to switch the UL communications beam the based on a measurement of the interference caused by the UL communications with the adaptive beam weight hybrid beamforming being greater than or equal to a threshold value.

At 426, the UE 402 may transmit a recommendation of a joint transmission and reception with the at least one network node 404 based on a measurement of the interference caused by the UL communications with the adaptive beam weight hybrid beamforming being greater than or equal to a threshold value. The network node 404 may receive a recommendation of a joint transmission and reception with the at least one network node 404 based on a measurement of the interference caused by the UL communications with the adaptive beam weight hybrid beamforming being greater than or equal to a threshold value. Here, the at least one network node 404. That is, in response to determining that the adaptive beam weight beamforming to the network node 404 may create unnecessary interference while there is another network node 404 that meets the interference constraints, the UE 402 may request the joint transmission and reception from another network node 404.

Figure 5:
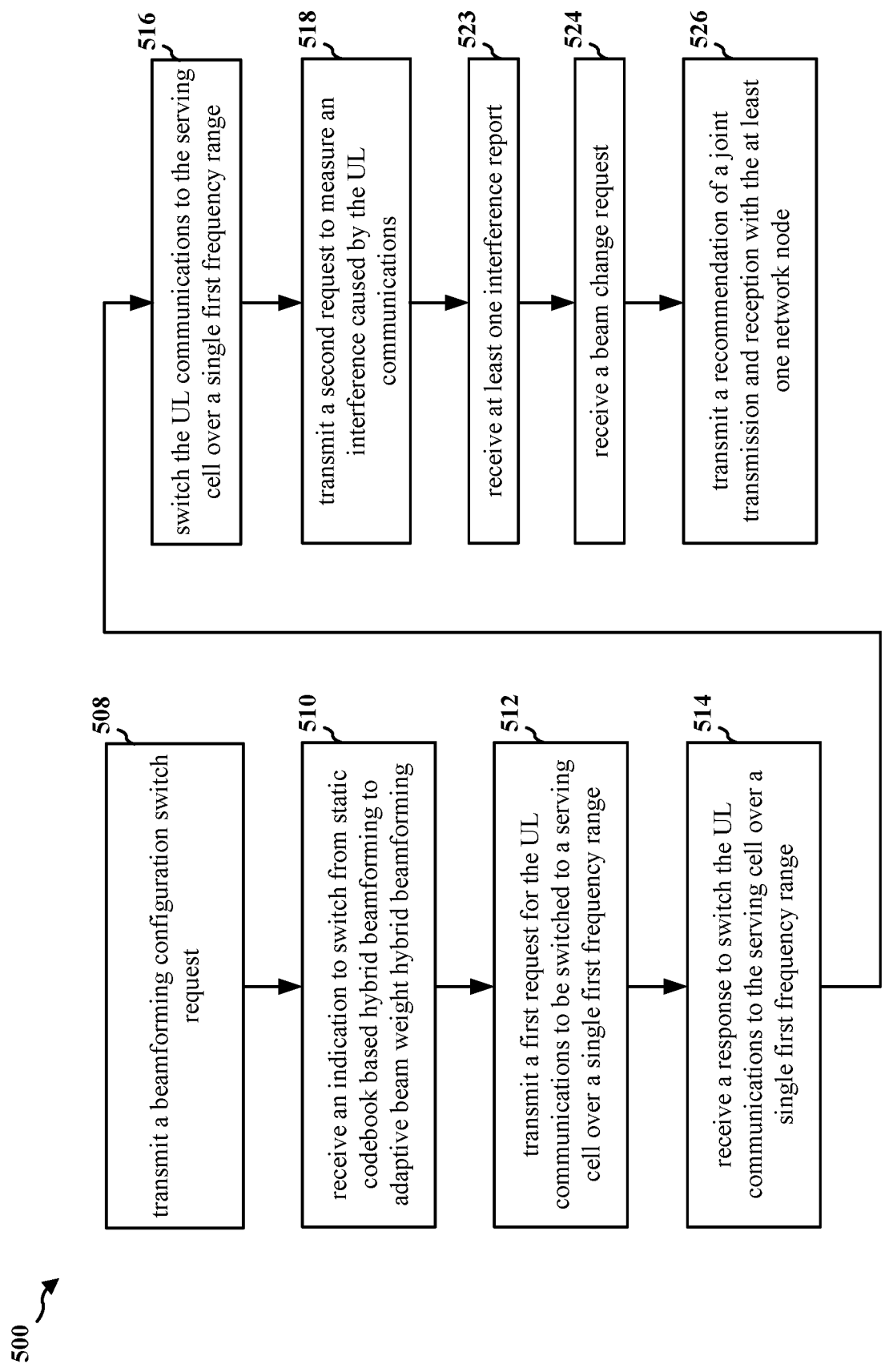
FIG. 5 is a flowchart of a method of wireless communication.

FIG. 5 is a flowchart 500 of a method of wireless communication. The method may be performed by a UE (e.g., the UE 104; the apparatus 904). The flowchart 500 may include the UE, a network node, and another network node/UE. The UE may be connected to a first serving cell in a first frequency range and a second serving cell in a second frequency range. The network node may be associated with a serving cell of the UE. The network node/UE may include one or more network nodes not associated with the at least one serving cell or one or more other UEs. The UE may transmit a first request for the UL communications with a network node to be switched from a first serving cell in a first frequency range and a second serving cell in a second frequency range to a serving cell over a single first frequency range based on switching from a static codebook based hybrid beamforming to at least one of an adaptive beam weight hybrid beamforming. The UE may further transmit a second request for the network node to measure an interference caused by the UL communications from the UE with the adaptive beam weight hybrid beamforming.

At 508, the UE may transmit a beamforming configuration switch request requesting the switch from the static codebook based hybrid beamforming to the at least one of the adaptive beam weight hybrid beamforming for the UL communications with the at least one network node. For example, at 408, the UE 402 may transmit a beamforming configuration switch request requesting the switch from the static codebook based hybrid beamforming to the at least one of the adaptive beam weight hybrid beamforming for the UL communications with the at least one network node 404.

Furthermore, 508 may be performed by an adaptive hybrid beamforming component 198.

At 510, the UE may receive an indication from the at least one network node 404 to switch from a static codebook based hybrid beamforming to at least one of an adaptive beam weight hybrid beamforming for UL communications. In one aspect, the indication to switch from the static codebook based hybrid beamforming to the at least one of the adaptive beam weight hybrid beamforming may be received based on a transmission of the beamforming configuration switch request. The indication may indicate the switch at the UE from the static codebook based hybrid beamforming to the adaptive beam weight hybrid beamforming. In another aspect, the network node may transmit the indication for the UE to switch from the static codebook based hybrid beamforming to the at least one of the adaptive beam weight hybrid beamforming without receiving a request from the UE. For example, at 410, the UE 402 may receive an indication from the at least one network node 404 to switch from a static codebook based hybrid beamforming to at least one of an adaptive beam weight hybrid beamforming or for UL communications. Furthermore, 510 may be performed by the adaptive hybrid beamforming component 198.

At 512, the UE may transmit a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming. Here, the first frequency range may correspond to FR1, and the second frequency range may correspond to frequencies greater than FR1, where the single first frequency range is the FR1 frequency range. For example, the second frequency range may be above 7.125 GHz, including the FR2, FR2-2, FR3, FR4, and FR5. In one aspect, the first request may include at least one of directions of one or more side lobes or levels of the one or more side lobes based on the adaptive beam weight hybrid beamforming. The network node may take the at least one of directions of one or more side lobes or levels of the one or more side lobes associated with the adaptive beam weight hybrid beamforming to determine whether to instruct the UE to switch the UL communications to the serving cell over the single first frequency range. In another aspect, the first request may be based on a configuration of sidelink communication. That is, the UE may recommend or request the at least one network node with the switch the UL communications from the first serving cell in the first frequency range and the second serving cell in the second frequency range to the serving cell over the single first frequency range based on configuration or measurement of any sidelink transmissions. The UE may infer the network environment based on the sidelink transmissions, and request that the UL communications using the at least one of the adaptive beam weight hybrid beamforming to be switched from the first serving cell in the first frequency range and the second serving cell in the second frequency range (e.g., FR2+FR1) to the serving cell over the single first frequency range (e.g., FR1). For example, at 412, the UE 402 may transmit a first request for the UL communications with the at least one network node 404 to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming. Furthermore, 512 may be performed by the adaptive hybrid beamforming component 198.

At 514, the UE may receive an affirmative response to switch the UL communications with the at least one network node from the first serving cell in the first frequency range and the second serving cell in the second frequency range to the serving cell over the single first frequency range. For example, at 414, the UE 402 may receive an affirmative response to switch the UL communications with the at least one network node 404 from the first serving cell in the first frequency range and the second serving cell in the second frequency range to the serving cell over the single first frequency range. Furthermore, 514 may be performed by the adaptive hybrid beamforming component 198.

At 516, the UE may switch the UL communications with the at least one network node from the first serving cell in the first frequency range and the second serving cell in the second frequency range to the serving cell over the single first frequency range. By switching the UE communications using the adaptive beam weight hybrid beamforming from the first serving cell in the first frequency range and the second serving cell in the second frequency range to a serving cell over the single first frequency range (e.g., FR2+FR1), the UE 402 may reduce the interference to the adjacent network entities (e.g., other network node or UEs) caused from switching from the static codebook based hybrid beamforming to at least one of the adaptive beam weight hybrid beamforming. For example, at 416, the UE 402 may switch the UL communications with the at least one network node 404 from the first serving cell in the first frequency range and the second serving cell in the second frequency range to the serving cell over the single first frequency range. Furthermore, 516 may be performed by the adaptive hybrid beamforming component 198.

At 518, the UE may transmit a second request for the at least one network node to measure an interference caused by the UL communications from the UE with the adaptive beam weight hybrid beamforming. In some aspects, the second request to measure the interference caused by the UL communications with the adaptive beam weight hybrid beamforming may include a request to instruct the other network node/UE to measure the interference caused by the UL communications with the adaptive beam weight hybrid beamforming at the other network node/UE. The other network node/UE may include the one or more network nodes not associated with the at least one serving cell and the one or more other UEs. In one aspect, the second request to measure the interference caused by the UL communications with the adaptive beam weight hybrid beamforming may include a request to instruct one or more network nodes not associated with the at least one serving cell of the other network node/UE to measure the interference caused by the UL communications with the adaptive beam weight hybrid beamforming. In another aspect, the second request to measure the interference caused by the UL communications with the adaptive beam weight hybrid beamforming may include a request to instruct one or more other UEs of the other network node/UE to measure the interference caused by the UL communications with the adaptive beam weight hybrid beamforming. In some aspect, the request to instruct the other network node/UE to measure the interference caused by the UL communications with the adaptive beam weight hybrid beamforming at the other network node/UE may be transmitted from the UE directly to the other network node/UE. The other network node/UE may include the one or more network nodes not associated with the at least one serving cell and the one or more other UEs. In one aspect, the request for the one or more network nodes not associated with the at least one serving cell to measure the interference caused by the UL communications with the adaptive beam weight hybrid beamforming at the one or more network nodes may be directly transmitted to the one or more network nodes of the other network node/UE. In another aspect, the request for the one or more other UEs to measure the interference caused by the UL communications with the adaptive beam weight hybrid beamforming at the one or more other UEs may be directly transmitted to the one or more other UEs of the other network node/UE. Here, the request may be transmitted from the UE to the one or more other UEs of the other network node/UE via a sidelink communication. For example, at 418, the UE 402 may transmit a second request for the at least one network node 404 to measure an interference caused by the UL communications from the UE 402 with the adaptive beam weight hybrid beamforming. Furthermore, 518 may be performed by the adaptive hybrid beamforming component 198.

At 523, the UE may receive at least one report of the interference caused by the UL communications with the adaptive beam weight hybrid beamforming. The at least one report may include at least one of a first report of a first interferences caused by the UL communications with the adaptive beam weight hybrid beamforming at the network node or a second report of a second interference caused by the UL communications with the adaptive beam weight hybrid beamforming at the other network node/UE. In one aspect, the network node may measure the first interference caused by the UL communications with the adaptive beam weight hybrid beamforming at the network node based on the second request received at 518, and transmit the first report of the first interference to the UE. The UE may receive the first report. In another aspect, the network node may send the second report of the second interference caused by the UL communications with the adaptive beam weight hybrid beamforming at the other network node/UE received at 522. In another aspect, the second report of the second interference caused by the UL communications with the adaptive beam weight hybrid beamforming at the other network node/UE may be directly received from the other network node/UE. In one example, the UE may receive the second report from the one or more other UEs of the other network node/UE via the sidelink communication. For example, at 423, the UE 402 may receive at least one report of the interference caused by the UL communications with the adaptive beam weight hybrid beamforming. Furthermore, 523 may be performed by the adaptive hybrid beamforming component 198.

At 524, the UE may receive a beam change request from the at least one network node to switch an UL communications beam the based on a measurement of the interference caused by the UL communications with the adaptive beam weight hybrid beamforming being greater than or equal to a threshold value. For example, at 424, the UE 402 may receive a beam change request from the at least one network node 404 to switch an UL communications beam the based on a measurement of the interference caused by the UL communications with the adaptive beam weight hybrid beamforming being greater than or equal to a threshold value. Furthermore, 524 may be performed by the adaptive hybrid beamforming component 198.

At 526, the UE may transmit a recommendation of a joint transmission and reception with the at least one network node based on a measurement of the interference caused by the UL communications with the adaptive beam weight hybrid beamforming being greater than or equal to a threshold value. That is, in response to determining that the adaptive beam weight beamforming to the network node may create unnecessary interference while there is another network node 404 that meets the interference constraints, the UE may request the joint transmission and reception from another network node. For example, at 426, the UE 402 may transmit a recommendation of a joint transmission and reception with the at least one network node 404 based on a measurement of the interference caused by the UL communications with the adaptive beam weight hybrid beamforming being greater than or equal to a threshold value. Furthermore, 526 may be performed by the adaptive hybrid beamforming component 198.

Figure 6:
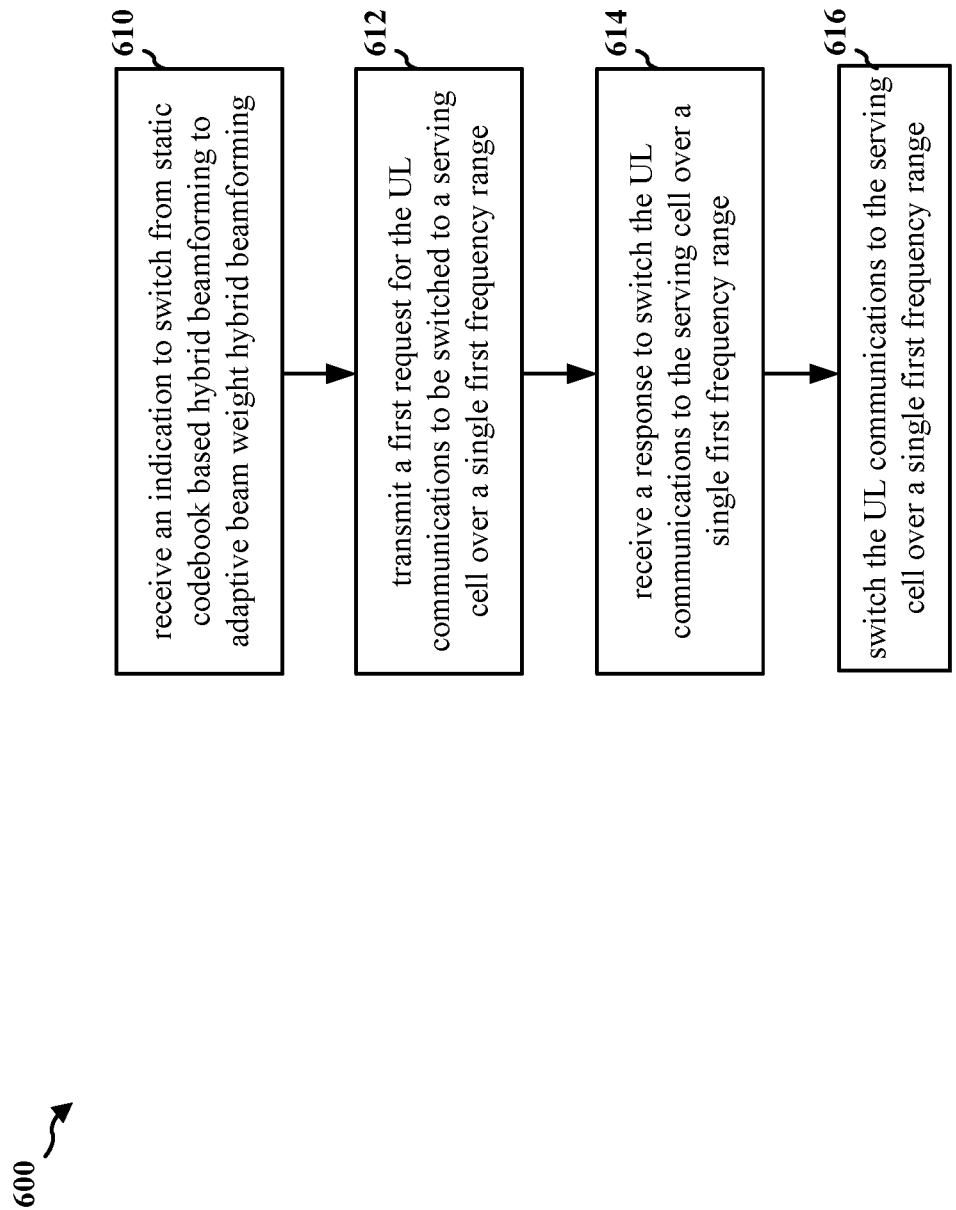
FIG. 6 is a flowchart of a method of wireless communication.

FIG. 6 is a flowchart 600 of a method of wireless communication. The method may be performed by a UE (e.g., the UE 104; the apparatus 904). The flowchart 600 may include the UE, a network node, and a network node/UE. The UE may be connected to a first serving cell in a first frequency range and a second serving cell in a second frequency range. The network node may be associated with a serving cell of the UE. The network node/UE may include one or more network nodes not associated with the at least one serving cell or one or more other UEs. The UE may transmit a first request for the UL communications with a network node to be switched from a first serving cell in a first frequency range and a second serving cell in a second frequency range to a serving cell over a single first frequency range based on switching from a static codebook based hybrid beamforming to at least one of an adaptive beam weight hybrid beamforming. The UE may further transmit a second request for the network node to measure an interference caused by the UL communications from the UE with the adaptive beam weight hybrid beamforming.

At 610, the UE may receive an indication from the at least one network node 404 to switch from a static codebook based hybrid beamforming to at least one of an adaptive beam weight hybrid beamforming for UL communications. In one aspect, the indication to switch from the static codebook based hybrid beamforming to the at least one of the adaptive beam weight hybrid beamforming may be received based on a transmission of the beamforming configuration switch request. The indication may indicate the switch at the UE from the static codebook based hybrid beamforming to the adaptive beam weight hybrid beamforming. In another aspect, the network node may transmit the indication for the UE to switch from the static codebook based hybrid beamforming to the at least one of the adaptive beam weight hybrid beamforming without receiving a request from the UE. For example, at 410, the UE 402 may receive an indication from the at least one network node 404 to switch from a static codebook based hybrid beamforming to at least one of an adaptive beam weight hybrid beamforming or for UL communications. Furthermore, 610 may be performed by the adaptive hybrid beamforming component 198.

At 612, the UE may transmit a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming. Here, the first frequency range may correspond to FR1, and the second frequency range may correspond to frequencies greater than FR1, where the single first frequency range is the FR1 frequency range. For example, the second frequency range may be above 7.125 GHz, including the FR2, FR2-2, FR3, FR4, and FR5. In one aspect, the first request may include at least one of directions of one or more side lobes or levels of the one or more side lobes based on the adaptive beam weight hybrid beamforming. The network node may take the at least one of directions of one or more side lobes or levels of the one or more side lobes associated with the adaptive beam weight hybrid beamforming to determine whether to instruct the UE to switch the UL communications to the serving cell over the single first frequency range. In another aspect, the first request may be based on a configuration of sidelink communication. That is, the UE may recommend or request the at least one network node with the switch the UL communications from the first serving cell in the first frequency range and the second serving cell in the second frequency range to the serving cell over the single first frequency range based on configuration or measurement of any sidelink transmissions. The UE may infer the network environment based on the sidelink transmissions, and request that the UL communications using the at least one of the adaptive beam weight hybrid beamforming to be switched from the first serving cell in the first frequency range and the second serving cell in the second frequency range (e.g., FR2+FR1) to the serving cell over the single first frequency range (e.g., FR1). For example, at 412, the UE 402 may transmit a first request for the UL communications with the at least one network node 404 to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming. Furthermore, 612 may be performed by the adaptive hybrid beamforming component 198.

At 614, the UE may receive an affirmative response to switch the UL communications with the at least one network node from the first serving cell in the first frequency range and the second serving cell in the second frequency range to the serving cell over the single first frequency range. For example, at 414, the UE 402 may receive an affirmative response to switch the UL communications with the at least one network node 404 from the first serving cell in the first frequency range and the second serving cell in the second frequency range to the serving cell over the single first frequency range. Furthermore, 614 may be performed by the adaptive hybrid beamforming component 198.

At 616, the UE may switch the UL communications with the at least one network node from the first serving cell in the first frequency range and the second serving cell in the second frequency range to the serving cell over the single first frequency range. By switching the UE communications using the adaptive beam weight hybrid beamforming from the first serving cell in the first frequency range and the second serving cell in the second frequency range to a serving cell over the single first frequency range (e.g., FR2+FR1), the UE 402 may reduce the interference to the adjacent network entities (e.g., other network node or UEs) caused from switching from the static codebook based hybrid beamforming to at least one of the adaptive beam weight hybrid beamforming. For example, at 416, the UE 402 may switch the UL communications with the at least one network node 404 from the first serving cell in the first frequency range and the second serving cell in the second frequency range to the serving cell over the single first frequency range. Furthermore, 616 may be performed by the adaptive hybrid beamforming component 198.

Figure 7:
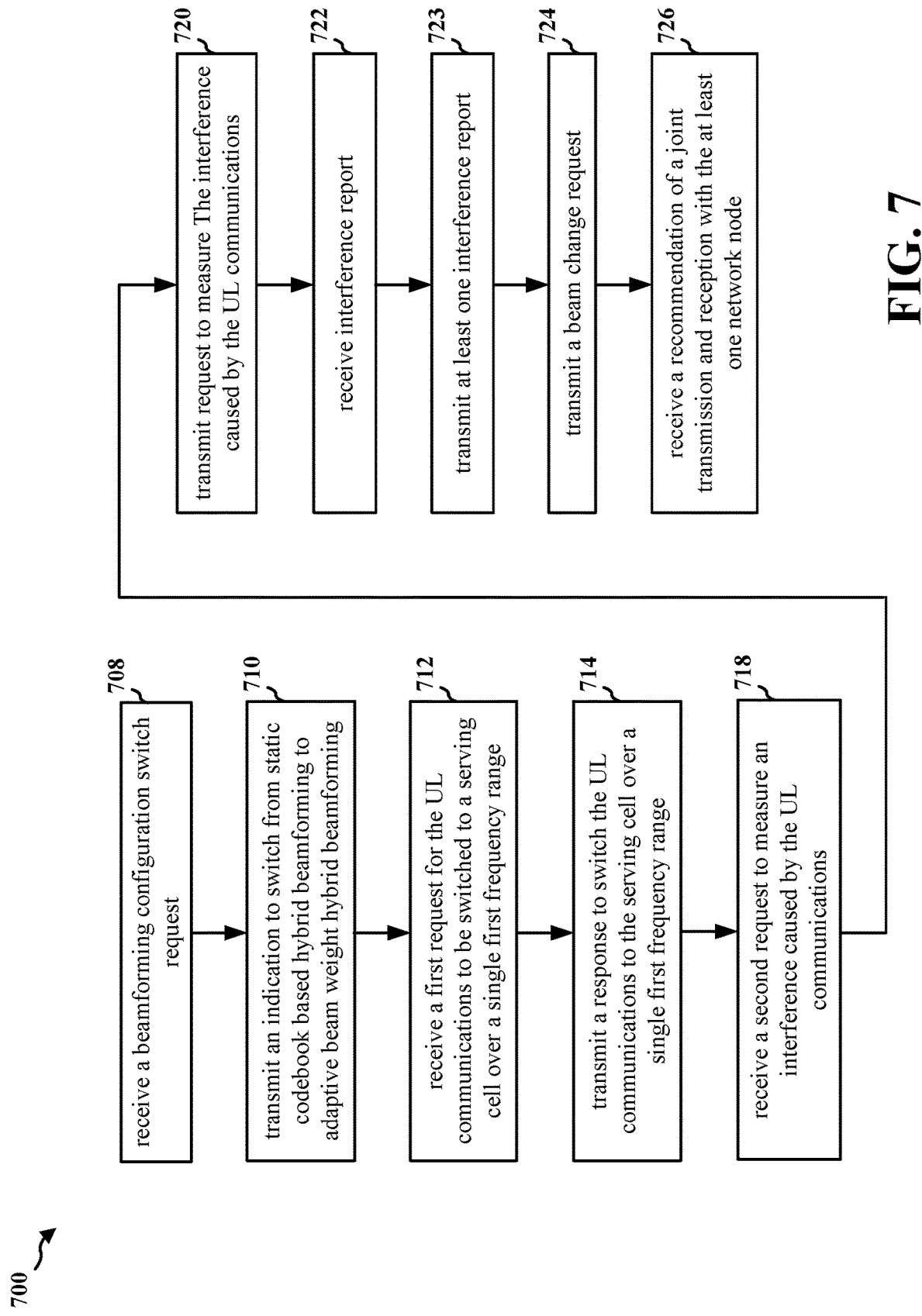
FIG. 7 is a flowchart of a method of wireless communication.

FIG. 7 is a flowchart 700 of a method of wireless communication. The method may be performed by a network node (e.g., the base station 102; the network node 1002;1160). The flowchart 700 may include a UE, the network node, and other network node/UE. The UE may be connected to a first serving cell in a first frequency range and a second serving cell in a second frequency range. The network node may be associated with a serving cell of the UE. The other network node/UE may include one or more network nodes not associated with the at least one serving cell or one or more other UEs. The network node may receive a first request for the UL communications with a network node to be switched from a first serving cell in a first frequency range and a second serving cell in a second frequency range to a serving cell over a single first frequency range based on switching from a static codebook based hybrid beamforming to at least one of an adaptive beam weight hybrid beamforming. The network node may further receive a second request for the network node to measure an interference caused by the UL communications from the UE with the adaptive beam weight hybrid beamforming.

At 708, the network node may receive a beamforming configuration switch request requesting the switch from the static codebook based hybrid beamforming to the at least one of the adaptive beam weight hybrid beamforming for the UL communications from the UE. For example, at 408, the network node 404 may receive a beamforming configuration switch request requesting the switch from the static codebook based hybrid beamforming to the at least one of the adaptive beam weight hybrid beamforming for the UL communications from the UE 402. Furthermore, 708 may be performed by an adaptive hybrid beamforming component 199.

At 710, the network node may transmit an indication for the UE to switch from a static codebook based hybrid beamforming to at least one of an adaptive beam weight hybrid beamforming for UL communications. In one aspect, the indication to switch from the static codebook based hybrid beamforming to the at least one of the adaptive beam weight hybrid beamforming may be received based on a transmission of the beamforming configuration switch request. The indication may indicate the switch at the UE from the static codebook based hybrid beamforming to the adaptive beam weight hybrid beamforming. In another aspect, the network node may transmit the indication for the UE to switch from the static codebook based hybrid beamforming to the at least one of the adaptive beam weight hybrid beamforming without receiving a request from the UE. For example, at 410, the network node 404 may transmit an indication for the UE 402 to switch from a static codebook based hybrid beamforming to at least one of an adaptive beam weight hybrid beamforming for UL communications. Furthermore, 710 may be performed by the adaptive hybrid beamforming component 199.

At 712, the network node may receive a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming.

Here, the first frequency range may correspond to FR1, and the second frequency range may correspond to frequencies greater than FR1, where the single first frequency range is the FR1 frequency range. For example, the second frequency range may be above 7.125 GHz, including the FR2, FR2-2, FR3, FR4, and FR5. In one aspect, the first request may include at least one of directions of one or more side lobes or levels of the one or more side lobes based on the adaptive beam weight hybrid beamforming. The network node may take the at least one of directions of one or more side lobes or levels of the one or more side lobes associated with the adaptive beam weight hybrid beamforming to determine whether to instruct the UE to switch the UL communications to the serving cell over the single first frequency range. In another aspect, the first request may be based on a configuration of sidelink communication. That is, the UE may recommend or request the at least one network node with the switch the UL communications from the first serving cell in the first frequency range and the second serving cell in the second frequency range to the serving cell over the single first frequency range based on configuration or measurement of any sidelink transmissions. The UE may infer the network environment based on the sidelink transmissions, and request that the UL communications using the at least one of the adaptive beam weight hybrid beamforming to be switched from the first serving cell in the first frequency range and the second serving cell in the second frequency range (e.g., FR2+FR1) to the serving cell over the single first frequency range (e.g., FR1). For example, at 412, the network node 404 may receive a first request for the UL communications from the UE 402 to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming. Furthermore, 712 may be performed by the adaptive hybrid beamforming component 199.

At 714, the network node may transmit an affirmative response to switch the UL communications from the UE from the first serving cell in the first frequency range and the second serving cell in the second frequency range to the serving cell over the single first frequency range. For example, at 414, the network node 404 may transmit an affirmative response to switch the UL communications from the UE 402 from the first serving cell in the first frequency range and the second serving cell in the second frequency range to the serving cell over the single first frequency range. Furthermore, 714 may be performed by the adaptive hybrid beamforming component 199.

At 718, the network node may receive a second request for the at least one network node to measure an interference caused by the UL communications from the UE with the adaptive beam weight hybrid beamforming. In some aspects, the second request to measure the interference caused by the UL communications with the adaptive beam weight hybrid beamforming may include a request to instruct the other network node/UE to measure the interference caused by the UL communications with the adaptive beam weight hybrid beamforming at the other network node/UE. The other network node/UE may include the one or more network nodes not associated with the at least one serving cell and the one or more other UEs. In one aspect, the second request to measure the interference caused by the UL communications with the adaptive beam weight hybrid beamforming may include a request to instruct one or more network nodes not associated with the at least one serving cell of the other network node/UE to measure the interference caused by the UL communications with the adaptive beam weight hybrid beamforming. In another aspect, the second request to measure the interference caused by the UL communications with the adaptive beam weight hybrid beamforming may include a request to instruct one or more other UEs of the other network node/UE to measure the interference caused by the UL communications with the adaptive beam weight hybrid beamforming. In some aspect, the request to instruct the other network node/UE to measure the interference caused by the UL communications with the adaptive beam weight hybrid beamforming at the other network node/UE may be transmitted from the UE directly to the other network node/UE. The other network node/UE may include the one or more network nodes not associated with the at least one serving cell and the one or more other UEs. In one aspect, the request for the one or more network nodes not associated with the at least one serving cell to measure the interference caused by the UL communications with the adaptive beam weight hybrid beamforming at the one or more network nodes may be directly transmitted to the one or more network nodes of the other network node/UE. In another aspect, the request for the one or more other UEs to measure the interference caused by the UL communications with the adaptive beam weight hybrid beamforming at the one or more other UEs may be directly transmitted to the one or more other UEs of the other network node/UE. Here, the request may be transmitted from the UE to the one or more other UEs of the other network node/UE via a sidelink communication. For example, at 418, the network node 404 may receive a second request for the at least one network node 404 to measure an interference caused by the UL communications from the UE 402 with the adaptive beam weight hybrid beamforming. Furthermore, 718 may be performed by the adaptive hybrid beamforming component 199.

At 720, the network node may instruct the other network node/UE to measure the interference caused by the UL communications with the adaptive beam weight hybrid beamforming. Here, the other network node/UE may include one or more network nodes not associated with the at least one serving cell or one or more other UEs. In one aspect, the network node 404 may instruct the one or more network nodes not associated with the at least one serving cell to measure the interference caused by the UL communications with the adaptive beam weight hybrid beamforming. In another aspect, the network node may instruct the one or more other UEs to measure the interference caused by the UL communications with the adaptive beam weight hybrid beamforming. For example, at 420, the network node 404 may instruct the network node/UE 406 to measure the interference caused by the UL communications with the adaptive beam weight hybrid beamforming. Furthermore, 720 may be performed by the adaptive hybrid beamforming component 199.

At 722, the network node may receive at least one report of the interference caused by the UL communications with the adaptive beam weight hybrid beamforming measured at the other network node/UE. The other network node/UE may include one or more network nodes not associated with the at least one serving cell or one or more other UEs, and the network node may determine whether the UL communications with the adaptive beam weight hybrid beamforming causes interference for the other network node/UE may include one or more network nodes not associated with the at least one serving cell or one or more other UEs. For example, at 422, the network node 404 may receive at least one report of the interference caused by the UL communications with the adaptive beam weight hybrid beamforming measured at the other network node/UE 406. Furthermore, 722 may be performed by the adaptive hybrid beamforming component 199.

At 723, the network node may transmit at least one report of the interference caused by the UL communications with the adaptive beam weight hybrid beamforming for the UE. The at least one report may include at least one of a first report of a first interferences caused by the UL communications with the adaptive beam weight hybrid beamforming at the network node or a second report of a second interference caused by the UL communications with the adaptive beam weight hybrid beamforming at the other network node/UE. In one aspect, the network node may measure the first interference caused by the UL communications with the adaptive beam weight hybrid beamforming at the network node based on the second request received at 718, and transmit the first report of the first interference to the UE. The UE may receive the first report. In another aspect, the network node may send the second report of the second interference caused by the UL communications with the adaptive beam weight hybrid beamforming at the other network node/UE received at 722. In another aspect, the second report of the second interference caused by the UL communications with the adaptive beam weight hybrid beamforming at the other network node/UE may be directly received from the other network node/UE. In one example, the UE may receive the second report from the one or more other UEs of the other network node/UE via the sidelink communication. For example, at 423, the network node 404 may transmit at least one report of the interference caused by the UL communications with the adaptive beam weight hybrid beamforming for the UE 402. Furthermore, 723 may be performed by the adaptive hybrid beamforming component 199.

At 724, the network node may transmit a beam change request from the at least one network node to switch an UL communications beam the based on a measurement of the interference caused by the UL communications with the adaptive beam weight hybrid beamforming being greater than or equal to a threshold value. For example, at 424, the network node 404 may transmit a beam change request from the at least one network node 404 to switch an UL communications beam the based on a measurement of the interference caused by the UL communications with the adaptive beam weight hybrid beamforming being greater than or equal to a threshold value. Furthermore, 724 may be performed by the adaptive hybrid beamforming component 199.

At 726, the network node may receive a recommendation of a joint transmission and reception with the at least one network node based on a measurement of the interference caused by the UL communications with the adaptive beam weight hybrid beamforming being greater than or equal to a threshold value. Here, the at least one network node 404. That is, in response to determining that the adaptive beam weight beamforming to the network node may create unnecessary interference while there is another network node 404 that meets the interference constraints, the UE may request the joint transmission and reception from another network node. For example, at 426, the network node 404 may receive a recommendation of a joint transmission and reception with the at least one network node 404 based on a measurement of the interference caused by the UL communications with the adaptive beam weight hybrid beamforming being greater than or equal to a threshold value. Furthermore, 726 may be performed by the adaptive hybrid beamforming component 199.

Figure 8:
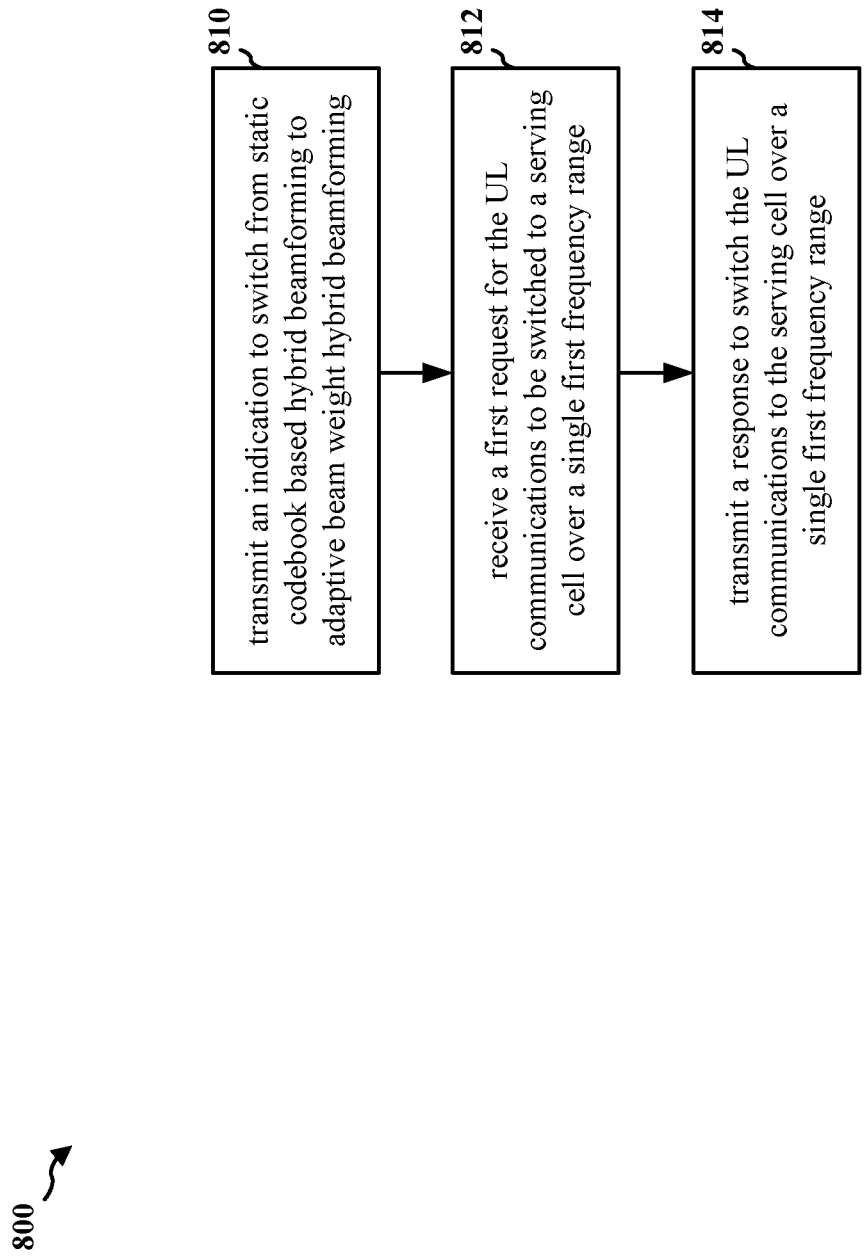
FIG. 8 is a flowchart of a method of wireless communication.

FIG. 8 is a flowchart 800 of a method of wireless communication. The method may be performed by a network node (e.g., the base station 102; the network node 1002; 1160). The flowchart 800 may include a UE, the network node, and other network node/UE. The UE may be connected to a first serving cell in a first frequency range and a second serving cell in a second frequency range. The network node may be associated with a serving cell of the UE. The other network node/UE may include one or more network nodes not associated with the at least one serving cell or one or more other UEs. The network node may receive a first request for the UL communications with a network node to be switched from a first serving cell in a first frequency range and a second serving cell in a second frequency range to a serving cell over a single first frequency range based on switching from a static codebook based hybrid beamforming to at least one of an adaptive beam weight hybrid beamforming. The network node may further receive a second request for the network node to measure an interference caused by the UL communications from the UE with the adaptive beam weight hybrid beamforming.

At 810, the network node may transmit an indication for the UE to switch from a static codebook based hybrid beamforming to at least one of an adaptive beam weight hybrid beamforming for UL communications. In one aspect, the indication to switch from the static codebook based hybrid beamforming to the at least one of the adaptive beam weight hybrid beamforming may be received based on a transmission of the beamforming configuration switch request. The indication may indicate the switch at the UE from the static codebook based hybrid beamforming to the adaptive beam weight hybrid beamforming. In another aspect, the network node may transmit the indication for the UE to switch from the static codebook based hybrid beamforming to the at least one of the adaptive beam weight hybrid beamforming without receiving a request from the UE. For example, at 410, the network node 404 may transmit an indication for the UE 402 to switch from a static codebook based hybrid beamforming to at least one of an adaptive beam weight hybrid beamforming for UL communications. Furthermore, 810 may be performed by the adaptive hybrid beamforming component 199.

At 812, the network node may receive a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming. Here, the first frequency range may correspond to FR1, and the second frequency range may correspond to frequencies greater than FR1, where the single first frequency range is the FR1 frequency range. For example, the second frequency range may be above 8.125 GHz, including the FR2, FR2-2, FR3, FR4, and FR5. In one aspect, the first request may include at least one of directions of one or more side lobes or levels of the one or more side lobes based on the adaptive beam weight hybrid beamforming. The network node may take the at least one of directions of one or more side lobes or levels of the one or more side lobes associated with the adaptive beam weight hybrid beamforming to determine whether to instruct the UE to switch the UL communications to the serving cell over the single first frequency range. In another aspect, the first request may be based on a configuration of sidelink communication. That is, the UE may recommend or request the at least one network node with the switch the UL communications from the first serving cell in the first frequency range and the second serving cell in the second frequency range to the serving cell over the single first frequency range based on configuration or measurement of any sidelink transmissions. The UE may infer the network environment based on the sidelink transmissions, and request that the UL communications using the at least one of the adaptive beam weight hybrid beamforming to be switched from the first serving cell in the first frequency range and the second serving cell in the second frequency range (e.g., FR2+FR1) to the serving cell over the single first frequency range (e.g., FR1). For example, at 412, the network node 404 may receive a first request for the UL communications from the UE 402 to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming. Furthermore, 812 may be performed by the adaptive hybrid beamforming component 199.

At 814, the network node may transmit an affirmative response to switch the UL communications from the UE from the first serving cell in the first frequency range and the second serving cell in the second frequency range to the serving cell over the single first frequency range. For example, at 414, the network node 404 may transmit an affirmative response to switch the UL communications from the UE 402 from the first serving cell in the first frequency range and the second serving cell in the second frequency range to the serving cell over the single first frequency range. Furthermore, 814 may be performed by the adaptive hybrid beamforming component 199.

Figure 9:
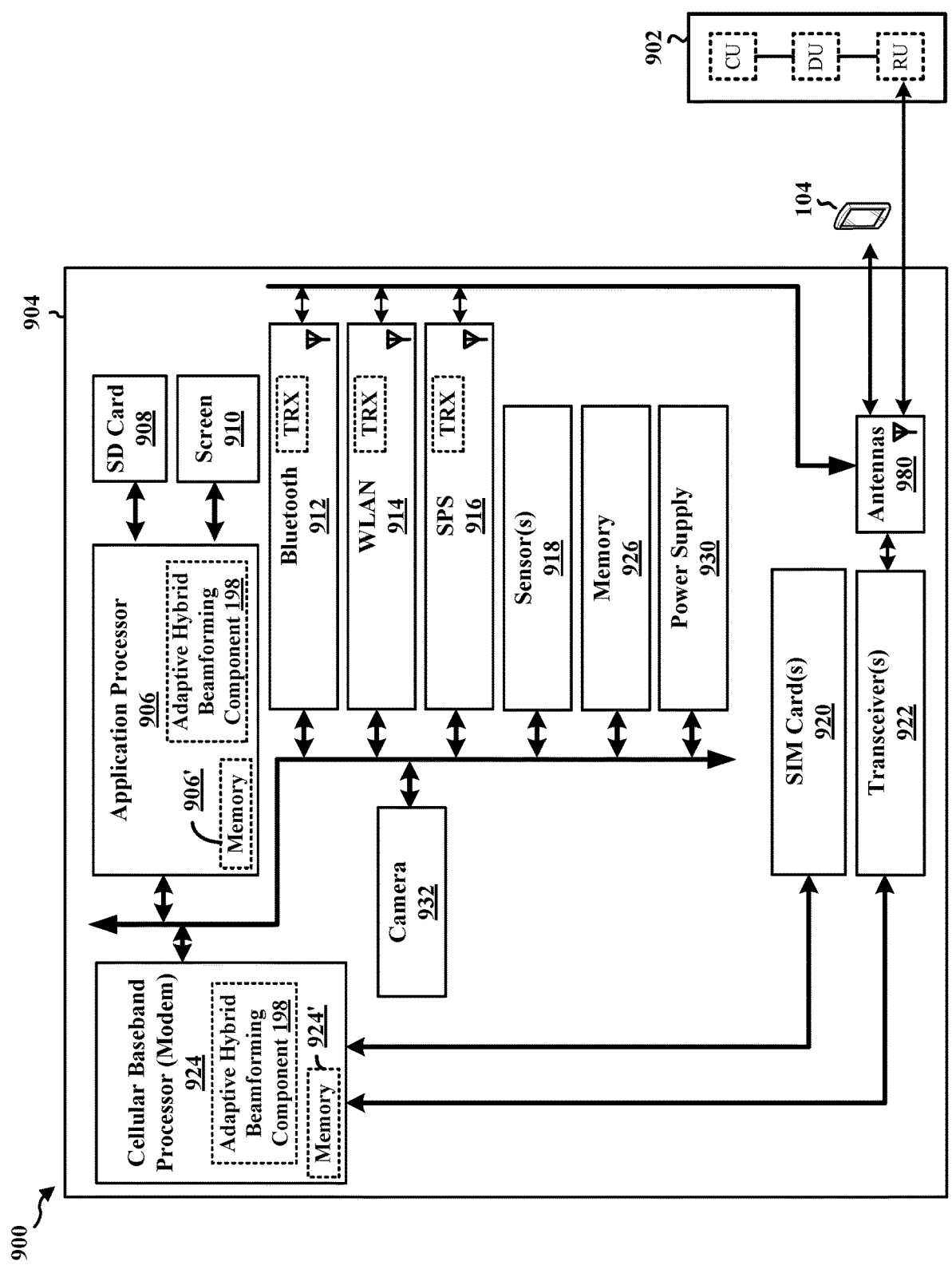
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described *supra*. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see 350 of FIG. 3) and include the additional modules of the apparatus 904.

As discussed *supra*, the adaptive hybrid beamforming component 198 is configured to receive an indication from at least one network node to switch from a static codebook based hybrid beamforming to at least one of an adaptive beam weight hybrid beamforming for uplink (UL) communications, transmit a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming, receive an affirmative response to switch the UL communications with the at least one network node from the first serving cell in the first frequency range and the second serving cell in the second frequency range to the serving cell over the single first frequency range, and switch the UL communications with the at least one network node from the first serving cell in the first frequency range and the second serving cell in the second frequency range to the serving cell over the single first frequency range. The adaptive hybrid beamforming component 198 may be within the cellular baseband processor 924, the application processor 906, or both the cellular baseband processor 924 and the application processor 906. The adaptive hybrid beamforming component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, includes means for transmitting a beamforming configuration switch request requesting the switch from the static codebook based hybrid beamforming to the at least one of the adaptive beam weight hybrid beamforming for the UL communications with the at least one network node, means for receiving an indication from at least one network node to switch from a static codebook based hybrid beamforming to at least one of an adaptive beam weight hybrid beamforming for UL communications, means for transmitting a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming, means for receiving an affirmative response to switch the UL communications with the at least one network node from the first serving cell in the first frequency range and the second serving cell in the second frequency range to the serving cell over the single first frequency range, and means for switching the UL communications with the at least one network node from the first serving cell in the first frequency range and the second serving cell in the second frequency range to the serving cell over the single first frequency range. The apparatus 904 includes means for transmitting a second request for the at least one network node to measure an interference caused by the UL communications from the UE with the adaptive beam weight hybrid beamforming, and means for receiving a beam change request from the at least one network node to switch an UL communications beam the based on a measurement of the interference caused by the UL communications with the adaptive beam weight hybrid beamforming being greater than or equal to a threshold value. The apparatus 904 includes means for transmitting a recommendation of a joint transmission and reception with the at least one network node based on a measurement of the interference caused by the UL communications with the adaptive beam weight hybrid beamforming being greater than or equal to a threshold value. The means may be the adaptive hybrid beamforming component 198 of the apparatus 904 configured to perform the functions recited by the means. As described *supra*, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
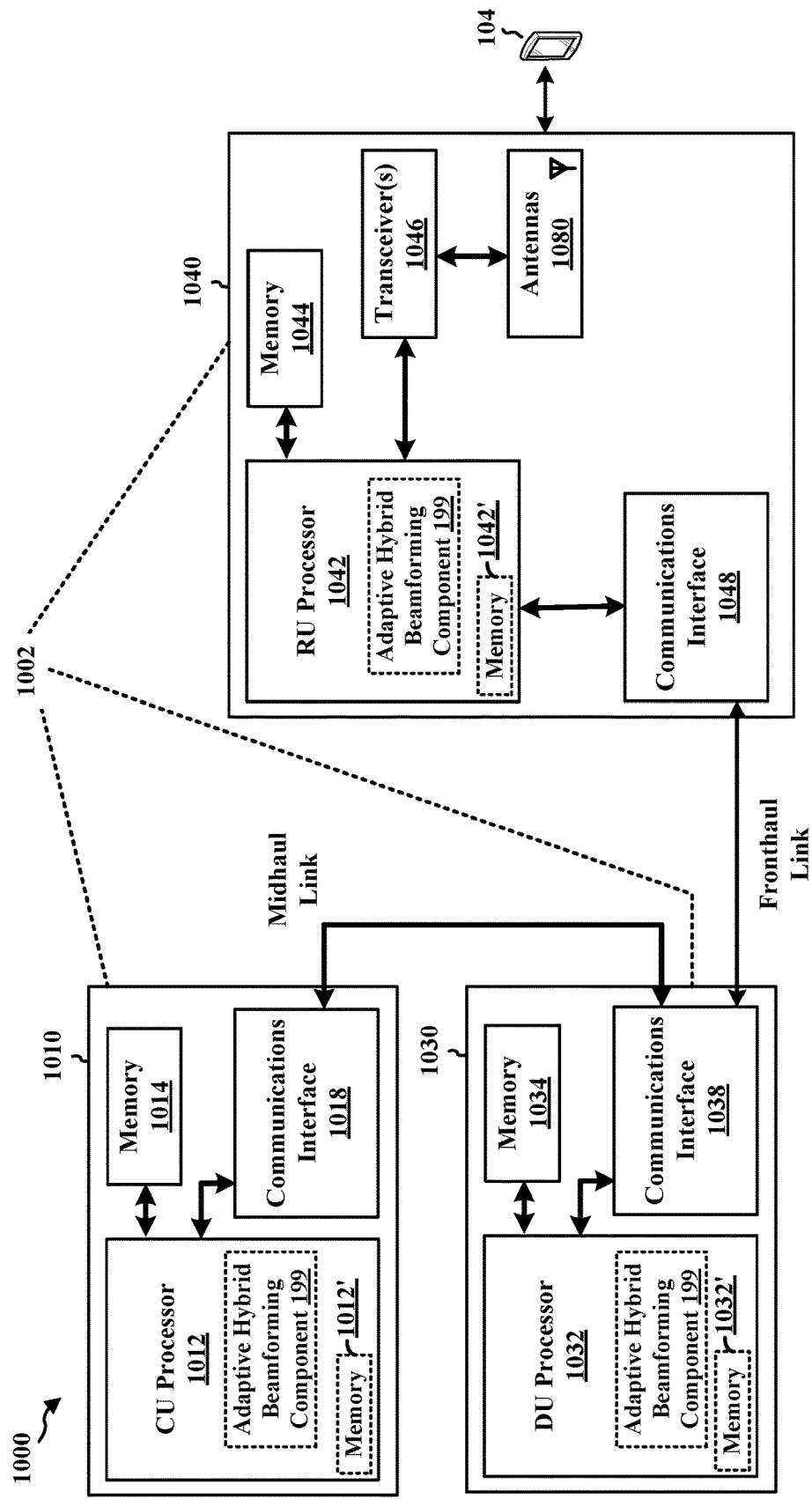
FIG. 10 is a diagram illustrating an example of a hardware implementation for an example network entity.

FIG. 10 is a diagram 1000 illustrating an example of a hardware implementation for a network node 1002. The network node 1002 may be a BS, a component of a BS, or may implement BS functionality. The network node 1002 may include at least one of a CU 1010, a DU 1030, or an RU 1040. For example, depending on the layer functionality handled by the adaptive hybrid beamforming component 199, the network node 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include a CU processor 1012. The CU processor 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include a DU processor 1032. The DU processor 1032 may include on-chip memory 1032'. In some aspects, the DU 1030 may further include additional memory modules 1034 and a communications interface 1038. The DU 1030 communicates with the RU 1040 through a fronthaul link. The RU 1040 may include an RU processor 1042. The RU processor 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory.

Each of the processors 1012, 1032, 1042 is responsible for general processing, including the execution of software stored on the computer-readable medium/memory. The software, when executed by the corresponding processor(s) causes the processor(s) to perform the various functions described *supra*. The computer-readable medium/memory may also be used for storing data that is manipulated by the processor(s) when executing software.

As discussed *supra*, the component is configured to transmit an indication for a UE to switch from a static codebook based hybrid beamforming to at least one of an adaptive beam weight hybrid beamforming for UL communications, receive a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming, and transmit an affirmative response to switch the UL communications from the UE from the first serving cell in the first frequency range and the second serving cell in the second frequency range to the serving cell over the single first frequency range. The adaptive hybrid beamforming component 199 may be within one or more processors of one or more of the CU 1010, DU 1030, and the RU 1040. The adaptive hybrid beamforming component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network node 1002 may include a variety of components configured for various functions. In one configuration, the network node 1002 includes means for receiving a beamforming configuration switch request requesting the switch from the static codebook based hybrid beamforming to the at least one of the adaptive beam weight hybrid beamforming for the UL communications from the UE, means for transmitting an indication for a UE to switch from a static codebook based hybrid beamforming to at least one of an adaptive beam weight hybrid beamforming for UL communications, means for receiving a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming, and means for transmitting an affirmative response to switch the UL communications from the UE from the first serving cell in the first frequency range and the second serving cell in the second frequency range to the serving cell over the single first frequency range. The network node 1002 includes means for receiving a second request for the at least one network node to measure an interference caused by the UL communications from the UE with the adaptive beam weight hybrid beamforming, means for measuring the interference caused by the UL communications from the UE with the adaptive beam weight hybrid beamforming, means for instructing the one or more network nodes not associated with the at least one serving cell to measure the interference caused by the UL communications with the adaptive beam weight hybrid beamforming or means for instructing the one or more other UEs to measure the interference caused by the UL communications with the adaptive beam weight hybrid beamforming. The network node 1002 includes means for transmitting a beam change request from the at least one network node to switch an UL communications beam the based on a measurement of the interference caused by the UL communications with the adaptive beam weight hybrid beamforming being greater than or equal to a threshold value. The network node 1002 includes means for receiving a recommendation of a joint transmission and reception with the at least one network node based on a measurement of the interference caused by the UL communications with the adaptive beam weight hybrid beamforming being greater than or equal to a threshold value. The means may be the adaptive hybrid beamforming component 199 of the network node 1002 configured to perform the functions recited by the means. As described *supra*, the network node 1002 may include the TX processor 316, the RX processor 370, and the controller/processor 375. As such, in one configuration, the means may be the TX processor 316, the RX processor 370, and/or the controller/processor 375 configured to perform the functions recited by the means.

Figure 11:
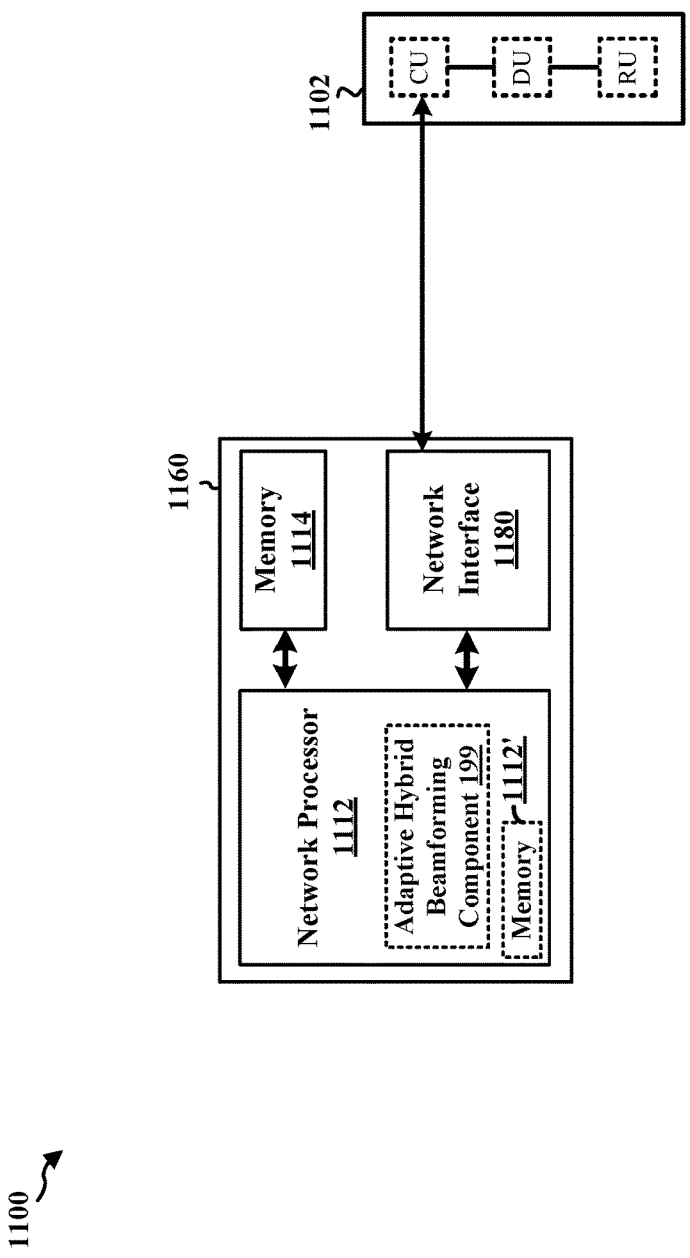
FIG. 11 is a diagram illustrating an example of a hardware implementation for an example network entity.

FIG. 11 is a diagram 1100 illustrating an example of a hardware implementation for a network entity 1160. In one example, the network entity 1160 may be within the core network 120. The network entity 1160 may include a network processor 1112. The network processor 1112 may include on-chip memory 1112'. In some aspects, the network entity 1160 may further include additional memory modules 1114. The network entity 1160 communicates via the network interface 1180 directly (e.g., backhaul link) or indirectly (e.g., through a RIC) with the CU 1102. The on-chip memory 1112' and the additional memory modules 1114 may each be considered a computer-readable medium/memory. Each computer-readable medium/memory may be non-transitory. The processor 1112 is responsible for general processing, including the execution of software stored on the computer-readable medium/memory. The software, when executed by the corresponding processor(s) causes the processor(s) to perform the various functions described *supra*. The computer-readable medium/memory may also be used for storing data that is manipulated by the processor(s) when executing software.

As discussed *supra*, the adaptive hybrid beamforming component 199 is configured to transmit an indication for a UE to switch from a static codebook based hybrid beamforming to at least one of an adaptive beam weight hybrid beamforming for UL communications, receive a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming, and transmit an affirmative response to switch the UL communications from the UE from the first serving cell in the first frequency range and the second serving cell in the second frequency range to the serving cell over the single first frequency range. The adaptive hybrid beamforming component 199 may be within the processor 1112. The adaptive hybrid beamforming component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1160 may include a variety of components configured for various functions. In one configuration, the network entity 1160 includes means for receiving a beamforming configuration switch request requesting the switch from the static codebook based hybrid beamforming to the at least one of the adaptive beam weight hybrid beamforming for the UL communications from the UE, means for transmitting an indication for a UE to switch from a static codebook based hybrid beamforming to at least one of an adaptive beam weight hybrid beamforming for UL communications, means for receiving a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming, and means for transmitting an affirmative response to switch the UL communications from the UE from the first serving cell in the first frequency range and the second serving cell in the second frequency range to the serving cell over the single first frequency range. The network entity 1160 includes means for receiving a second request for the at least one network node to measure an interference caused by the UL communications from the UE with the adaptive beam weight hybrid beamforming, means for measuring the interference caused by the UL communications from the UE with the adaptive beam weight hybrid beamforming, means for instructing the one or more network nodes not associated with the at least one serving cell to measure the interference caused by the UL communications with the adaptive beam weight hybrid beamforming or means for instructing the one or more other UEs to measure the interference caused by the UL communications with the adaptive beam weight hybrid beamforming. The network entity 1160 includes means for transmitting a beam change request from the at least one network node to switch an UL communications beam the based on a measurement of the interference caused by the UL communications with the adaptive beam weight hybrid beamforming being greater than or equal to a threshold value. The network entity 1160 includes means for receiving a recommendation of a joint transmission and reception with the at least one network node based on a measurement of the interference caused by the UL communications with the adaptive beam weight hybrid beamforming being greater than or equal to a threshold value. The means may be the adaptive hybrid beamforming component 199 of the network entity 1160 configured to perform the functions recited by the means.

A UE may transmit a first request for the UL communications with a network node to be switched from a first serving cell in a first frequency range and a second serving cell in a second frequency range to a serving cell over a single first frequency range based on switching from a static codebook based hybrid beamforming to at least one of an adaptive beam weight hybrid beamforming. In response, the network node may transmit an affirmative response to switch the UL communications to the serving cell over the single first frequency range. The UE may further transmit a second request for the network node to measure an interference caused by the UL communications from the UE with the adaptive beam weight hybrid beamforming.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving an indication from at least one network node to switch from a static codebook based hybrid beamforming to at least one of an adaptive beam weight hybrid beamforming for UL communications, transmitting a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming, receiving an affirmative response to switch the UL communications with the at least one network node from the first serving cell in the first frequency range and the second serving cell in the second frequency range to the serving cell over the single first frequency range, and switching the UL communications with the at least one network node from the first serving cell in the first frequency range and the second serving cell in the second frequency range to the serving cell over the single first frequency range.

Aspect 2 is the method of aspect 1, further including transmitting a beamforming configuration switch request requesting the switch from the static codebook based hybrid beamforming to the at least one of the adaptive beam weight hybrid beamforming for the UL communications with the at least one network node, where the indication to switch from the static codebook based hybrid beamforming to the at least one of the adaptive beam weight hybrid beamforming is received based on a transmission of the beamforming configuration switch request.

Aspect 3 is the method of any of aspects 1 and 2, where the first frequency range corresponds to FR1, and the second frequency range corresponds to frequencies greater than FR1, where the single first frequency range is the FR1 frequency range.

Aspect 4 is the method of any of aspects 1 to 3, where the indication indicates the switch at the UE from the static codebook based hybrid beamforming to the adaptive beam weight hybrid beamforming.

Aspect 5 is the method of any of aspects 1 to 3, further including transmitting a second request for the at least one network node to measure an interference caused by the UL communications from the UE with the adaptive beam weight hybrid beamforming.

Aspect 6 is the method of aspect 5, where the second request to measure the interference caused by the UL communications with the adaptive beam weight hybrid beamforming is associated with at least one of a spatial relationship of a beam used by the UE for the UL communications or a set of beams used by the UE for beamforming.

Aspect 7 is the method of aspect 6, where the second request to measure the interference caused by the UL communications with the adaptive beam weight hybrid beamforming includes a request to instruct one or more network nodes not associated with the at least one serving cell to measure the interference caused by the UL communications with the adaptive beam weight hybrid beamforming.

Aspect 8 is the method of any of aspects 6 and 7, where the second request to measure the interference caused by the UL communications with the adaptive beam weight hybrid beamforming includes a request to instruct one or more other UEs to measure the interference caused by the UL communications with the adaptive beam weight hybrid beamforming.

Aspect 9 is the method of any of aspects 6 to 8, further including receiving a beam change request from the at least one network node to switch an UL communications beam the based on a measurement of the interference caused by the UL communications with the adaptive beam weight hybrid beamforming being greater than or equal to a threshold value.

Aspect 10 is the method of any of aspects 6 to 9, further including transmitting a recommendation of a joint transmission and reception with the at least one network node based on a measurement of the interference caused by the UL communications with the adaptive beam weight hybrid beamforming being greater than or equal to a threshold value.

Aspect 11 is the method of any of aspects 1 to 10, where the first request includes at least one of directions of one or more side lobes or levels of the one or more side lobes based on the adaptive beam weight hybrid beamforming.

Aspect 12 is the method of any of aspects 1 to 11, where the first request is based on a configuration of sidelink communication.

Aspect 13 is an apparatus for wireless communication including at least one processor coupled to a memory and configured to implement any of aspects 1 to 12, further including a transceiver coupled to the at least one processor.

Aspect 14 is an apparatus for wireless communication including means for implementing any of aspects 1 to 12.

Aspect 15 is a non-transitory computer-readable medium storing computer executable code, where the code when executed by a processor causes the processor to implement any of aspects 1 to 12.

Aspect 16 is a method of wireless communication at a base station, including transmitting an indication for a UE to switch from a static codebook based hybrid beamforming to at least one of an adaptive beam weight hybrid beamforming for UL communications, receiving a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming, and transmitting an affirmative response to switch the UL communications from the UE from the first serving cell in the first frequency range and the second serving cell in the second frequency range to the serving cell over the single first frequency range.

Aspect 17 is the method of aspect 16, further including receiving a beamforming configuration switch request requesting the switch from the static codebook based hybrid beamforming to the at least one of the adaptive beam weight hybrid beamforming for the UL communications from the UE, where the indication to switch from the static codebook based hybrid beamforming to the at least one of the adaptive beam weight hybrid beamforming is transmitted based on a reception of the beamforming configuration switch request.

Aspect 18 is the method of any of aspects 16 and 17, where the first frequency range corresponds to FR1, and the second frequency range corresponds to frequencies greater than FR1, where the single first frequency range is the FR1 frequency range.

Aspect 19 is the method of any of aspects 16 to 18, where the indication indicates the switch at the UE from the static codebook based hybrid beamforming to the adaptive beam weight hybrid beamforming.

Aspect 20 is the method of any of aspects 16 to 18, further including receiving a second request for the at least one network node to measure an interference caused by the UL communications from the UE with the adaptive beam weight hybrid beamforming, and measuring the interference caused by the UL communications from the UE with the adaptive beam weight hybrid beamforming.

Aspect 21 is the method of aspect 20, where the second request to measure the interference caused by the UL communications with the adaptive beam weight hybrid beamforming is associated with at least one of a spatial relationship of a beam used by the UE for the UL communications or a set of beams used by the UE for beamforming.

Aspect 22 is the method of aspect 21, where the second request to measure the interference caused by the UL communications with the adaptive beam weight hybrid beamforming includes a request to instruct one or more network nodes not associated with the at least one serving cell to measure the interference caused by the UL communications with the adaptive beam weight hybrid beamforming, and where the method further includes instructing the one or more network nodes not associated with the at least one serving cell to measure the interference caused by the UL communications with the adaptive beam weight hybrid beamforming.

Aspect 23 is the method of any of aspects 21 and 22, where the second request to measure the interference caused by the UL communications with the adaptive beam weight hybrid beamforming includes a request to instruct one or more other UEs to measure the interference caused by the UL communications with the adaptive beam weight hybrid beamforming, and where the method further includes instruct the one or more other UEs to measure the interference caused by the UL communications with the adaptive beam weight hybrid beamforming.

Aspect 24 is the method of any of aspects 21 to 23, further including transmit a beam change request from the at least one network node to switch an UL communications beam the based on a measurement of the interference caused by the UL communications with the adaptive beam weight hybrid beamforming being greater than or equal to a threshold value.

Aspect 25 is the method of any of aspects 21 to 24, further includes receive a recommendation of a joint transmission and reception with the at least one network node based on a measurement of the interference caused by the UL communications with the adaptive beam weight hybrid beamforming being greater than or equal to a threshold value.

Aspect 26 is the method of any of aspects 16 to 25, where the first request includes at least one of directions of one or more side lobes or levels of the one or more side lobes based on the adaptive beam weight hybrid beamforming.

Aspect 27 is the method of any of aspects 16 to 26, where the first request is based on a configuration of sidelink communication.

Aspect 28 is an apparatus for wireless communication including at least one processor coupled to a memory and configured to implement any of aspects 16 to 27, further including a transceiver coupled to the at least one processor.

Aspect 29 is an apparatus for wireless communication including means for implementing any of aspects 16 to 27.

Aspect 30 is a non-transitory computer-readable medium storing computer executable code, where the code when executed by a processor causes the processor to implement any of aspects 16 to 27.

What is claimed is:
1. An apparatus for wireless communication at a user equipment (UE), comprising:
a memory; and
at least one processor coupled to the memory and configured to:

receive an indication from at least one network node to switch from a static codebook based hybrid beamforming to at least one of an adaptive beam weight hybrid beamforming for uplink (UL) communications;

transmit a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming;

receive an affirmative response to switch the UL communications with the at least one network node from the first serving cell in the first frequency range and the second serving cell in the second frequency range to the serving cell over the single first frequency range; and switch the UL communications with the at least one network node from the first serving cell in the first frequency range and the second serving cell in the second frequency range to the serving cell over the single first frequency range.

2. The apparatus of claim 1, wherein the at least one processor is further configured to:

transmit a beamforming configuration switch request requesting the switch from the static codebook based hybrid beamforming to the at least one of the adaptive beam weight hybrid beamforming for the UL communications with the at least one network node, wherein the indication to switch from the static codebook based hybrid beamforming to the at least one of the adaptive beam weight hybrid beamforming is received based on a transmission of the beamforming configuration switch request.

3. The apparatus of claim 1, wherein the first frequency range corresponds to frequency range 1 (FR1) frequency range, and the second frequency range corresponds to frequencies greater than the FR1 frequency range, wherein the single first frequency range is the FR1 frequency range.

4. The apparatus of claim 1, wherein the indication indicates the switch at the UE from the static codebook based hybrid beamforming to the adaptive beam weight hybrid beamforming.

5. The apparatus of claim 1, wherein the at least one processor is further configured to transmit a second request for the at least one network node to measure an interference caused by the UL communications from the UE with the adaptive beam weight hybrid beamforming.

6. The apparatus of claim 5, wherein the second request to measure the interference caused by the UL communications with the adaptive beam weight hybrid beamforming is associated with at least one of a spatial relationship of a beam used by the UE for the UL communications or a set of beams used by the UE for beamforming.

7. The apparatus of claim 6, wherein the second request to measure the interference caused by the UL communications with the adaptive beam weight hybrid beamforming includes a request to instruct one or more network nodes not associated with the at least one serving cell to measure the interference caused by the UL communications with the adaptive beam weight hybrid beamforming.

8. The apparatus of claim 6, wherein the second request to measure the interference caused by the UL communications with the adaptive beam weight hybrid beamforming includes a request to instruct one or more other UEs to measure the interference caused by the UL communications with the adaptive beam weight hybrid beamforming.

9. The apparatus of claim 6, wherein the at least one processor is further configured to receive a beam change request from the at least one network node to switch an UL communications beam based on a measurement of the interference caused by the UL communications with the adaptive beam weight hybrid beamforming being greater than or equal to a threshold value.

10. The apparatus of claim 6, wherein the at least one processor is further configured to transmit a recommendation of a joint transmission and reception with the at least one network node based on a measurement of the interference caused by the UL communications with the adaptive beam weight hybrid beamforming being greater than or equal to a threshold value.

11. The apparatus of claim 1, wherein the first request includes at least one of directions of one or more side lobes or levels of the one or more side lobes based on the adaptive beam weight hybrid beamforming.

12. The apparatus of claim 1, further comprising a transceiver coupled to the at least one processor, wherein the first request is based on a configuration of sidelink communication.

13. A method of wireless communication at a user equipment (UE), comprising:

receiving an indication from at least one network node to switch from a static codebook based hybrid beamforming to at least one of an adaptive beam weight hybrid beamforming or a non-codebook based hybrid beamforming for uplink (UL) communications;

transmitting a first request for the UL communications with the at least one network node to be switched from a first serving cell in a first frequency range and a second serving cell in a second frequency range to a serving cell over a single first frequency range, based on receiving the indication to switch from the static codebook based hybrid beamforming to at least one of the adaptive beam weight hybrid beamforming;

receiving an affirmative response to switch the UL communications with the at least one network node from the first serving cell in the first frequency range and the second serving cell in the second frequency range to the serving cell over the single first frequency range; and switching the UL communications with the at least one network node from the first serving cell in the first frequency range and the second serving cell in the second frequency range to the serving cell over the single first frequency range.

14. The method of claim 13, wherein the first frequency range corresponds to frequency range 1 (FR1) frequency range, and the second frequency range corresponds to frequencies greater than the FR1 frequency range, wherein the single first frequency range is the FR1 frequency range.

15. The method of claim 13, further including transmitting a second request for the at least one network node to measure an interference caused by the UL communications from the UE with the adaptive beam weight hybrid beamforming.

16. An apparatus for wireless communication at a network node, comprising:

a memory; and at least one processor coupled to the memory and configured to:

transmit an indication for a user equipment (UE) to switch from a static codebook based hybrid beamforming to at least one of an adaptive beam weight hybrid beamforming for uplink (UL) communications;

receive a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming; and transmit an affirmative response to switch the UL communications from the UE from the first serving cell in the first frequency range and the second serving cell in the second frequency range to the serving cell over the single first frequency range.

17. The apparatus of claim 16, wherein the at least one processor is further configured to:

receive a beamforming configuration switch request requesting the switch from the static codebook based hybrid beamforming to the at least one of the adaptive beam weight hybrid beamforming for the UL communications from the UE, wherein the indication to switch from the static codebook based hybrid beamforming to the at least one of the adaptive beam weight hybrid beamforming is transmitted based on a reception of the beamforming configuration switch request.

18. The apparatus of claim 16, wherein the first frequency range corresponds to frequency range 1 (FR1) frequency range, and the second frequency range corresponds to frequencies greater than the FR1 frequency range, wherein the single first frequency range is the FR1 frequency range.

19. The apparatus of claim 16, wherein the indication indicates the switch at the UE from the static codebook based hybrid beamforming to the adaptive beam weight hybrid beamforming.

20. The apparatus of claim 16, wherein the at least one processor is further configured to:

receive a second request for the network node to measure an interference caused by the UL communications from the UE with the adaptive beam weight hybrid beamforming; and measure the interference caused by the UL communications from the UE with the adaptive beam weight hybrid beamforming.

21. The apparatus of claim 20, wherein the second request to measure the interference caused by the UL communications with the adaptive beam weight hybrid beamforming is associated with at least one of a spatial relationship of a beam used by the UE for the UL communications or a set of beams used by the UE for beamforming.

22. The apparatus of claim 21, wherein the second request to measure the interference caused by the UL communications with the adaptive beam weight hybrid beamforming includes a request to instruct one or more network nodes not associated with at least one serving cell to measure the interference caused by the UL communications with the adaptive beam weight hybrid beamforming, wherein the at least one processor is further configured to instruct the one or more network nodes not associated with the at least one serving cell to measure the interference caused by the UL communications with the adaptive beam weight hybrid beamforming.

23. The apparatus of claim 21, wherein the second request to measure the interference caused by the UL communications with the adaptive beam weight hybrid beamforming includes a request to instruct one or more other UEs to measure the interference caused by the UL communications with the adaptive beam weight hybrid beamforming, wherein the at least one processor is further configured to instruct the one or more other UEs to measure the interference caused by the UL communications with the adaptive beam weight hybrid beamforming.

24. The apparatus of claim 21, wherein the at least one processor is further configured to transmit a beam change request from the network node to switch an UL communications beam based on a measurement of the interference caused by the UL communications with the adaptive beam weight hybrid beamforming being greater than or equal to a threshold value.

25. The apparatus of claim 21, wherein the at least one processor is further configured to receive a recommendation of a joint transmission and reception with the network node based on a measurement of the interference caused by the UL communications with the adaptive beam weight hybrid beamforming being greater than or equal to a threshold value.

26. The apparatus of claim 16, wherein the first request includes at least one of directions of one or more side lobes or levels of the one or more side lobes based on the adaptive beam weight hybrid beamforming.

27. The apparatus of claim 16, further comprising a transceiver coupled to the at least one processor, wherein the first request is based on a configuration of sidelink communication.

28. A method of wireless communication at a network node, comprising:

transmitting an indication for a user equipment (UE) to switch from a static codebook based hybrid beamforming to at least one of an adaptive beam weight hybrid beamforming for uplink (UL) communications;

receiving a first request for the UL communications from the UE to be switched from a first serving cell in a first frequency range and a second serving cell in a second frequency range to a serving cell over a single first frequency range, based on transmitting the indication to switch from the static codebook based hybrid beamforming to at least one of the adaptive beam weight hybrid beamforming; and transmitting an affirmative response to switch the UL communications from the UE from the first serving cell in the first frequency range and the second serving cell in the second frequency range to the serving cell over the single first frequency range.

29. The method of claim 28, wherein the first frequency range corresponds to frequency range 1 (FR1) frequency range, and the second frequency range corresponds to frequencies greater than the FR1 frequency range, wherein the single first frequency range is the FR1 frequency range.

30. The method of claim 28, further comprising:

receiving a second request for the network node to measure an interference caused by the UL communications from the UE with the adaptive beam weight hybrid beamforming; and measuring the interference caused by the UL communications from the UE with the adaptive beam weight hybrid beamforming.

* * * * *